US012049120B2

(12) United States Patent
Westendarp et al.

(10) Patent No.: US 12,049,120 B2
(45) Date of Patent: *Jul. 30, 2024

(54) PARKING COOLER

(71) Applicant: Dometic Sweden AB, Solna (SE)

(72) Inventors: Daniel Fedor Westendarp, Münster (DE); Thorsten Wichert, Ibbenbüren (DE); Michael Dunkel, Lüdinghausen (DE)

(73) Assignee: Dometic Sweden AB, Solna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,790

(22) Filed: Mar. 24, 2023

(65) Prior Publication Data

US 2023/0226879 A1 Jul. 20, 2023

Related U.S. Application Data

(60) Continuation of application No. 16/744,584, filed on Jan. 16, 2020, now Pat. No. 11,613,157, which is a
(Continued)

(51) Int. Cl.
*F25B 49/02* (2006.01)
*B60H 1/00* (2006.01)
*B60H 1/32* (2006.01)

(52) U.S. Cl.
CPC ..... *B60H 1/00378* (2013.01); *B60H 1/00428* (2013.01); *B60H 1/00521* (2013.01); *B60H 1/00542* (2013.01); *B60H 1/00985* (2013.01); *B60H 2001/00235* (2013.01); *B60H 1/3226* (2013.01); *B60H 2001/3255* (2013.01); *B60H 2001/3272* (2013.01); *B60H 2001/3277* (2013.01); *B60H 2001/3282* (2013.01); *F25B 49/02* (2013.01); *F25B 49/022* (2013.01); *Y02T 10/88* (2013.01)

(58) Field of Classification Search
CPC ............ B60H 1/00378; B60H 1/00542; B60H 1/00521; F25B 49/022; F25B 49/02
See application file for complete search history.

(56) References Cited

U.S. PATENT DOCUMENTS

| 964,146 A | 7/1910 | Clark |
| RE24,637 E | 4/1959 | Mulle |

(Continued)

FOREIGN PATENT DOCUMENTS

| AU | 3067405 | 3/2016 |
| AU | 201612249 | 5/2016 |

(Continued)

OTHER PUBLICATIONS

Transmittal Letter of Related Cases.
(Continued)

*Primary Examiner* — Filip Zec
(74) *Attorney, Agent, or Firm* — Dinsmore & Shohl LLP

(57) ABSTRACT

A parking cooler which is capable of battery powered operation during engine off operation. The parking cooler or air conditioning system may vary in cooling capacities to maximize cooling or maximize battery life. The parking cooler includes one or more condensers and a housing to accommodate such variation of cooling capacity.

19 Claims, 13 Drawing Sheets

Related U.S. Application Data division of application No. 15/407,709, filed on Jan. 17, 2017, now Pat. No. 10,589,593.

(60) Provisional application No. 62/280,352, filed on Jan. 19, 2016.

(56) References Cited

U.S. PATENT DOCUMENTS

| | | | |
|---|---|---|---|
| 3,092,009 A | 6/1963 | Goettl | |
| 3,115,082 A | 12/1963 | Sanoff | |
| 3,528,359 A | 9/1970 | Sand | |
| 3,680,468 A | 8/1972 | Schueler | |
| D226,381 S | 2/1973 | Harty | |
| 3,719,058 A | 3/1973 | Waygood | |
| 3,727,537 A | 4/1973 | Harty | |
| 3,848,428 A | 11/1974 | Rieter, Jr. | |
| 3,867,486 A | 2/1975 | Nagele | |
| 3,885,398 A | 5/1975 | Dawkins | |
| 3,974,755 A | 8/1976 | Honmann | |
| 4,043,143 A | 8/1977 | Fluder et al. | |
| 4,051,691 A | 10/1977 | Dawkins | |
| 4,189,987 A | 2/1980 | Amberg et al. | |
| D257,637 S | 12/1980 | Armbruster | |
| 4,502,368 A | 3/1985 | Hempel | |
| 4,502,467 A | 3/1985 | Smith | |
| 4,550,648 A | 11/1985 | Eagle | |
| D284,025 S | 5/1986 | Armstrong | |
| 4,608,834 A | 9/1986 | Rummer | |
| 4,637,299 A | 1/1987 | Harding | |
| 4,641,502 A | 2/1987 | Aldrich et al. | |
| 4,665,804 A | 5/1987 | Muyasaka | |
| 4,672,818 A | 6/1987 | Roth | |
| 4,690,040 A | 9/1987 | Barnett | |
| 4,693,174 A | 9/1987 | Anderson | |
| 4,709,623 A | 12/1987 | Roth et al. | |
| D296,583 S | 7/1988 | Barradas | |
| 4,760,773 A | 8/1988 | Pezzulli | |
| D300,777 S | 4/1989 | Bales et al. | |
| D306,341 S | 2/1990 | Bales et al. | |
| 5,056,262 A | 10/1991 | Schweiss et al. | |
| 5,176,570 A | 1/1993 | Leidl | |
| D343,894 S | 2/1994 | Anderson | |
| 5,307,645 A | 5/1994 | Pannell | |
| 5,366,149 A | 11/1994 | Kline | |
| 5,403,183 A | 4/1995 | Andersson et al. | |
| D360,681 S | 7/1995 | Chopko | |
| 5,435,781 A | 7/1995 | Kitchens | |
| D367,524 S | 2/1996 | Waldschmidt et al. | |
| 5,494,244 A | 2/1996 | Walton | |
| 5,501,634 A | 3/1996 | Wilder | |
| 5,531,641 A | 7/1996 | Aldrich et al. | |
| 5,556,335 A | 9/1996 | Holyoake | |
| 5,588,910 A | 12/1996 | Hutter et al. | |
| 5,632,156 A | 5/1997 | Takeo et al. | |
| 5,643,081 A | 7/1997 | Klein | |
| D391,632 S | 3/1998 | Thomas | |
| 5,727,998 A | 3/1998 | Kreuger et al. | |
| 5,752,877 A | 5/1998 | Sun | |
| 5,765,383 A | 6/1998 | Inoue | |
| 5,860,856 A | 1/1999 | Teich et al. | |
| 5,863,310 A | 1/1999 | Brown et al. | |
| 5,964,910 A | 10/1999 | Keele | |
| D424,184 S | 5/2000 | Chang-Kwon | |
| 6,066,041 A | 5/2000 | Hernandez et al. | |
| 6,073,456 A | 6/2000 | Kawai et al. | |
| 6,076,370 A | 6/2000 | Da Silva | |
| D428,480 S | 7/2000 | Flanagan | |
| 6,101,829 A | 8/2000 | Robinson | |
| 6,116,037 A | 9/2000 | Burnett | |
| 6,149,513 A | 11/2000 | Lyu | |
| D435,639 S | 12/2000 | Slavonia et al. | |
| 6,171,062 B1 | 1/2001 | Bucher et al. | |
| D437,396 S | 2/2001 | Flanagan | |
| 6,196,914 B1 | 3/2001 | Lyu | |
| 6,234,893 B1 | 5/2001 | Meredith | |
| 6,241,794 B1 | 6/2001 | Jadran et al. | |
| 6,250,373 B1 | 6/2001 | Vecchi et al. | |
| 6,257,976 B1 | 7/2001 | Richardson, III | |
| 6,263,685 B1 | 7/2001 | Strobel | |
| 6,302,780 B1 | 10/2001 | Ahn et al. | |
| 6,339,934 B1 | 1/2002 | Yoon | |
| D454,625 S | 3/2002 | Flanagan | |
| 6,351,957 B2 | 3/2002 | Hara | |
| 6,357,249 B1 | 3/2002 | Robinson et al. | |
| 6,367,270 B2 | 4/2002 | Niimi et al. | |
| 6,370,899 B1 | 4/2002 | Hobbs et al. | |
| 6,370,906 B1 | 4/2002 | Kuo | |
| 6,415,622 B2 | 7/2002 | Kim et al. | |
| 6,536,222 B1 | 3/2003 | Ahn et al. | |
| 6,554,880 B1 | 4/2003 | Northcutt | |
| 6,571,572 B1 | 6/2003 | Hobbs et al. | |
| 6,601,356 B2 | 8/2003 | Snyder | |
| 6,616,523 B1 | 9/2003 | Tani et al. | |
| 6,626,003 B1 | 9/2003 | Kortum et al. | |
| 6,745,586 B1 | 6/2004 | Reimann et al. | |
| 6,761,038 B1 | 7/2004 | Bushnell | |
| D495,041 S | 8/2004 | Thomas | |
| 6,814,660 B1 | 11/2004 | Cavett | |
| 6,857,953 B2 | 2/2005 | Malott | |
| 6,889,762 B2 | 5/2005 | Zeigler et al. | |
| 7,086,740 B2 | 8/2006 | Sample | |
| 7,140,192 B2 | 11/2006 | Allen et al. | |
| 7,171,822 B2 | 2/2007 | Allen et al. | |
| D538,413 S | 3/2007 | Lyu et al. | |
| 7,201,010 B2 | 4/2007 | Homan et al. | |
| D541,917 S | 5/2007 | Pfeiffer | |
| 7,234,315 B2 | 6/2007 | Allen et al. | |
| 7,237,397 B2 | 7/2007 | Allen | |
| D554,544 S | 11/2007 | Englert | |
| D560,785 S | 1/2008 | Galeazzi | |
| 7,316,119 B2 | 1/2008 | Allen | |
| 7,334,834 B2 | 2/2008 | Hill et al. | |
| 7,441,414 B2 | 10/2008 | Ziehr et al. | |
| 7,448,227 B2 | 11/2008 | Zeigler et al. | |
| 7,454,922 B2 | 11/2008 | Zeigler et al. | |
| 7,591,143 B2 | 9/2009 | Zeigler et al. | |
| 7,591,303 B2 | 9/2009 | Zeigler et al. | |
| D619,151 S | 7/2010 | Tsuji | |
| 7,797,958 B2 | 9/2010 | Alston et al. | |
| 7,832,221 B2 | 11/2010 | Wijaya et al. | |
| D629,094 S | 12/2010 | Thomas | |
| 7,845,187 B2 | 12/2010 | Patel et al. | |
| 7,934,387 B2 | 5/2011 | Lee et al. | |
| 7,963,117 B2 | 6/2011 | Allen et al. | |
| 8,015,833 B2 | 9/2011 | Cikanek et al. | |
| 8,096,482 B2 | 1/2012 | Dage | |
| 8,171,866 B2 | 5/2012 | Dunstan | |
| D661,386 S | 6/2012 | Bergin | |
| 8,249,749 B2 | 8/2012 | Dage et al. | |
| D672,450 S | 12/2012 | Milks et al. | |
| 8,453,722 B2 | 6/2013 | Zeigler et al. | |
| 8,535,127 B2 | 9/2013 | Malott | |
| 8,568,209 B2 | 10/2013 | Boxum | |
| D712,531 S | 9/2014 | Bergin | |
| D715,907 S | 10/2014 | Bergin | |
| D716,925 S | 11/2014 | Bergin | |
| D782,939 S | 4/2017 | Allard | |
| 9,631,832 B2 | 4/2017 | Malott | |
| D785,771 S | 5/2017 | Bergin et al. | |
| D785,772 S | 5/2017 | Bergin et al. | |
| 9,931,906 B2 | 4/2018 | Frazier et al. | |
| 10,040,332 B2 | 8/2018 | Lawrence et al. | |
| 10,239,381 B2 | 3/2019 | O'Brien | |
| D862,668 S | 10/2019 | Moseley | |
| D865,926 S | 11/2019 | Moseley | |
| 10,589,593 B2 | 3/2020 | Westendarp | |
| 10,675,950 B2 * | 6/2020 | Renken | F25B 41/20 |
| 10,807,437 B2 * | 10/2020 | Vehr | B60H 1/3208 |
| 2001/0032471 A1 | 10/2001 | Taguchi | |
| 2001/0053668 A1 | 12/2001 | Berger | |
| 2003/0162492 A1 | 8/2003 | Caferro et al. | |
| 2003/0220070 A1 | 11/2003 | Orendorff et al. | |
| 2004/0005854 A1 | 1/2004 | Shin | |
| 2004/0038643 A1 | 2/2004 | Katagiri et al. | |

(56) References Cited

U.S. PATENT DOCUMENTS

| | | |
|---|---|---|
| 2004/0072532 A1 | 4/2004 | Cho |
| 2004/0127152 A1 | 7/2004 | Malott |
| 2005/0087332 A1 | 4/2005 | Umeo et al. |
| 2005/0227609 A1 | 10/2005 | Koessler |
| 2005/0257543 A1* | 11/2005 | Martin .................. F25D 29/003 62/244 |
| 2006/0026936 A1 | 2/2006 | Paumier et al. |
| 2006/0052050 A1 | 3/2006 | Malott et al. |
| 2006/0083889 A1 | 4/2006 | Schuckers |
| 2006/0112702 A1* | 6/2006 | Martin .................... F25B 49/02 62/186 |
| 2006/0179871 A1 | 8/2006 | Wagner |
| 2007/0000265 A1 | 1/2007 | McEnaney et al. |
| 2007/0066215 A1 | 3/2007 | Song et al. |
| 2007/0131408 A1 | 6/2007 | Zeigler et al. |
| 2007/0157522 A1 | 7/2007 | Hebert et al. |
| 2007/0227168 A1 | 10/2007 | Simmons |
| 2007/0227693 A1 | 10/2007 | Allen et al. |
| 2007/0287374 A1 | 12/2007 | Day et al. |
| 2007/0298702 A1 | 12/2007 | Boxum |
| 2007/0299560 A1 | 12/2007 | LaHue et al. |
| 2008/0014852 A1 | 1/2008 | Mielke et al. |
| 2008/0034767 A1 | 2/2008 | Ziehr et al. |
| 2008/0146136 A1 | 6/2008 | Degutis et al. |
| 2009/0098820 A1 | 4/2009 | Yabu |
| 2009/0107743 A1 | 4/2009 | Alston |
| 2009/0277197 A1 | 11/2009 | Gambiana et al. |
| 2010/0089563 A1 | 4/2010 | Sundhar |
| 2010/0224754 A1 | 9/2010 | Khan |
| 2011/0016894 A1 | 1/2011 | Lemon et al. |
| 2011/0067420 A1 | 3/2011 | Alston et al. |
| 2011/0302942 A1 | 12/2011 | Birchard |
| 2012/0210733 A1 | 8/2012 | Kolavennu et al. |
| 2012/0247131 A1 | 10/2012 | Esch |
| 2012/0324927 A1 | 12/2012 | Suzuki |
| 2013/0047648 A1 | 2/2013 | Zeigler et al. |
| 2013/0109294 A1 | 5/2013 | Tolinski et al. |
| 2013/0157557 A1 | 6/2013 | Malott |
| 2013/0185939 A1 | 7/2013 | Zapotocky |
| 2013/0205811 A1 | 8/2013 | Esch |
| 2014/0033742 A1 | 2/2014 | Esch |
| 2014/0188313 A1 | 7/2014 | Huang |
| 2014/0223928 A1 | 8/2014 | Esch |
| 2014/0260393 A1 | 9/2014 | Siddiqui |
| 2015/0052916 A1* | 2/2015 | Spurgeon ............. B60H 1/3216 62/126 |
| 2015/0087216 A1 | 3/2015 | Stover et al. |
| 2015/0107814 A1 | 4/2015 | Jeong |
| 2015/0251521 A1 | 9/2015 | Brauer et al. |
| 2015/0328985 A1 | 11/2015 | Kim et al. |
| 2015/0352924 A1 | 12/2015 | Allard |
| 2016/0076271 A1 | 3/2016 | Reinking |
| 2016/0207372 A1 | 7/2016 | Parry |
| 2017/0203632 A1 | 7/2017 | Westendarp et al. |
| 2018/0312036 A1* | 11/2018 | Kim .................. B60H 1/00921 |

FOREIGN PATENT DOCUMENTS

| | | |
|---|---|---|
| AU | 201613590 | 7/2016 |
| AU | 201613591 | 7/2016 |
| AU | 201613592 | 7/2016 |
| AU | 201613593 | 7/2016 |
| AU | 201712794 | 5/2017 |
| AU | 201712798 | 5/2017 |
| AU | 2017101887 A4 | 10/2020 |
| CA | 1011592 | 6/1977 |
| CA | 167431 | 3/2016 |
| CA | 172872 | 3/2016 |
| CA | 172873 | 3/2016 |
| CA | 172874 | 3/2016 |
| CA | 165232 | 5/2016 |
| CA | 165233 | 5/2016 |
| CN | 102431413 A | 5/2012 |
| CN | 202419811 U | 9/2012 |
| CN | 103273821 A | 9/2013 |
| CN | 103568775 A | 2/2014 |
| CN | 201630322524.2 | 4/2017 |
| EM | 003323740 | 7/2016 |
| EM | 003421643 | 10/2016 |
| EM | 003479179 | 11/2016 |
| EP | 0180053 | 10/1985 |
| EP | 0064769 | 8/1986 |
| EP | 1681517 | 7/2006 |
| EP | 1832452 | 9/2007 |
| FR | 2087220 | 12/1971 |
| GB | 2297157 | 7/1996 |
| JP | 52137854 | 11/1977 |
| JP | 7164866 A | 6/1995 |
| JP | 2004125338 | 4/2004 |
| KR | 2005119747 A | 12/2005 |
| KR | 10-2013-0001913 A | 1/2013 |
| WO | 2004099681 | 11/2004 |
| WO | 2014143181 | 9/2014 |
| WO | 2015/126019 A1 | 8/2015 |
| WO | 15134185 | 9/2015 |

OTHER PUBLICATIONS

10-Minute Tech, Trailer Life, Jul. 1996, pp. 69-70 dated Jul. 1, 1996.
American RV Company, Dometic 459530 Duo Therm 13,500 BTU Brisk Air Conditioner High Efficiency Upper Unit Trailer Camper RV, Mar. 23, 2014 https://web.archive.org/web/20140323013456/http://www.americanrvcompany.com/Dometic-459530-Duo-Therm-13500-BTU-Brisk-Air-Conditioner-High-Efficiency-Upper-Unit-Trailer-Camper-RV Mar. 23, 2014.
American RV Company, Dometic 541815 High Performance 13,500 BTU Air Conditioner Upper Unit CCC2 Required Electronics Pre-Installed Camper Trailer RV, http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.
American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV Mar. 23, 2014.
American RV Company, Dometic 541916 High Performance 15,000 BTU Air Conditioner Upper Unit Single Zone LCD Thermostat Required Electronics Pre-Installed Camper Trailer RV, http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV.
American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-II-Camper-Trailer-RV Mar. 23, 2014.
Australian Patent Application 2017220186 entitled "Parking Cooler" filed Jan. 11, 2017.
Chinese Patent Application 201710040123.1 entitled "Parking Cooler" filed Jan. 18, 2017.
European Patent Application 17152275.8 entitled "Parking Cooler" filed Jan. 19, 2017.
Canadian Patent Application 2,906,348 entitled "Modular Air Grill Assembly" as filed Sep. 14, 2016 (national stage entry date).
Canadian Intellectual Property Office, Office Action for App. No. 167431 dated Oct. 8, 2016.
Dirna Bergstrom: Parking Coolers—No-Idle Electrical A/C—MiniCool Compact 1.4; http://www.dima.com/parking-coolers-no-idle-electrical-ac-compact/ Mar. 17, 2015.
Dirna Bergstrom: Slim Cool; http://www.dirna.com/files/dirna-manuals/220RE00183.pdf May 21, 2014.
Dometic Corporation, Dometic High Performance Air Conditioners, 2 pages, Jan. 1, 2011.
Dometic Duo-Therm, p. 140.
Dometic Group: "Climate Control", http://www.dometic.com/enus/Americas/USA/RV-Products/climate, 2 pages.

(56) References Cited

OTHER PUBLICATIONS

Dometic Waeco Coolair RT 880; http://www.dometic.co.uk/product/waeco-coolair-rt-880-2/ May 14, 2015.
Eberspacher Cooltronic Parking Coolers with High Efficiency with the Engine OFF; http://www.eberspacher.com/products/air-conditioning/cooltronic-truck-parking-coolers.html Jun. 23, 2015.
European Design Patent Application No. 003300219 entitled "Air Shroud Assembly" filed Jul. 8, 2016.
Indelb; WO Oblo'; Sleeping Well Oblo; http://www.indelb.com/products/parking_air_cooler/sleeping_well/sw_oblo Apr. 1, 2016.
International Search Report and Written Opinion for PCT/US2013/065458 dated Jan. 29, 2014.
Design U.S. Appl. No. 29/542,555 entitled "Modular Air Grill Design" filed Oct. 15, 2015.
Design U.S. Appl. No. 29/552,019 entitled "Air Shroud Assembly" dated Jan. 19, 2016.
Design U.S. Appl. No. 29/581,176 entitled "Air-Conditioning Unit" dated Oct. 17, 2016.
Design U.S. Appl. No. 29/594,476 entitled "Shroud Assembly" filed Feb. 17, 2017.
Design U.S. Appl. No. 29/604,433 entitled "Air Conditioning Apparatus" filed May 17, 2017.
Design U.S. Appl. No. 29/573,473 entitled "Recreational Vehicle Air-Conditioning Unit" filed Aug. 5, 2016.
Webasto: Rooftop air conditioning systems: Rooftop 3.5-9.9 kw; http://www.eberspacher.com/products/air-conditioning/cooltronic-truck-parking-coolers.html May 14, 2014.
Webasto: Truck parking cooler: Cool Top Vario 10 E; http://www.webasto.com/GB/markets-products/truck/air-conditioning/products/cool-top-vario/ Apr. 25, 2016.
Youtube; Viesa Kompressor; https://www.youtube.com/watch?v=SPK17XEvVL0 May 22, 2012 (https://www.google.com/?gws_rd=ssl#q=https://www.youtube.com/watch?v%3DSPK17XEvVL0&spf=1495819902591).
Notice of Allowance issued in Design U.S. Appl. No. 29/620,395 on May 31, 2019.
Corrected Notice of Allowability issued in Design U.S. Appl. No. 29/620,395 on Jul. 5, 2019.
Notice of Allowance issued in US Design U.S. Appl. No. 29/620,394 on Jul. 8, 2019.
Office Action for European Application No. 17152275.8 mailed on Jul. 29, 2019.
US Patent and Trademark Office, Restriction Requirement for U.S. Appl. No. 29/552,019.
US Patent and Trademark Office, Office Action for U.S. Appl. No. 29/552,019 dated Aug. 4, 2017.
US Patent and Trademark Office, Notice of Allowance for U.S. Appl. No. 29/552,019 dated.
Non-Final Office Action for U.S. Appl. No. 15/407,709 mailed on May 15, 2019.
Notice of Allowance issued in U.S. Appl. No. 15/407,709 on Oct. 10, 2019.
Office Action for European Application No. 17152275.8 mailed on Nov. 8, 2019.
Office Action Issued in Chinese Patent Application No. 201710040123.1 mailed on Apr. 14, 2021, 31 Pages.
Office Action Issued in Chinese Patent Application No. 201710040123.1 Mailed on Dec. 15, 2021.
Notice to Grant issued in Chinese Patent Application No. 201710401231.2 mailed on Mar. 23, 2022.
Design Divisional U.S. Appl. No. 29/620,395 entitled "Air Shroud Assembly" filed Oct. 4, 2017.
Design Divisional U.S. Appl. No. 29/620,394 entitled "Air Shroud Assembly" filed Oct. 4, 2017.
Partial European Search Report and Written Opinion for European Application No. 17152275.8 mailed on Sep. 17, 2017.
Extended European Search Report and Written Opinion for European Application No. 17152275.8 mailed on Mar. 7, 2018.
Office Action for European Application No. 17152275.8 mailed on Nov. 22, 2018.
Intention to Grant for European Application No. 17152275.8 mailed on Jan. 7, 2020.
Restriction Requiremnet Issued in U.S. Appl. No. 16/744,584 mailed on May 28, 2021.
Non Final Office Action Issued in U.S. Appl. No. 16/744,584 mailed on Oct. 8, 2021.
Final Office Action Issued in U.S. Appl. No. 16/744,584 mailed on May 12, 2022.
Notice of Allowance Issued in U.S. Appl. No. 16/744,584 mailed on Nov. 15, 2022.
Utility U.S. Appl. No. 18/189,797 entitled "Parking Cooler" filed Mar. 24, 2023.

* cited by examiner

PARKING COOLER

CROSS-REFERENCE

Cross-reference is made to U.S. Design patent application No. 29/552,019, titled "Air Shroud Assembly," filed on Jan. 19, 2016 and is expressly incorporated herein by reference.

CLAIM TO PRIORITY

This continuation patent application claims priority to and benefit of, under 35 U.S.C. § 120, U.S. Divisional patent application Ser. No. 16/744,584, filed Jan. 16, 2020, titled "Parking Cooler", which claims priority to U.S. patent application Ser. No. 15/407,709, filed Jan. 17, 2017, titled "Parking Cooler", which claims priority, under U.S.C. § 119(e), U.S. Provisional Patent Application Ser. No. 62/280,352, filed Jan. 19, 2016, titled "Parking Cooler", all of which is incorporated by reference herein.

BACKGROUND

Field of the Invention

Present embodiments pertain to a parking cooler for over-the-road vehicles. More particularly, the present embodiments pertain to a parking cooler having battery powered air conditioning using a variable speed compressor which varies operating conditions based on comparisons between temperature set point and actual temperature in a cabin.

Description of the Related Art

The increasing use of over-the-road trucks for shipping has resulted in a need for trucks to have air conditioning systems that are more environmentally friendly and which provide adequate environmental conditioning for drivers.

In long haul trucking, regulations require rest periods for drivers which have logged some maximum number of consecutive driving hours, or driving hours in a 24-hour period. When the limit is met, the drivers are required to pull off the road and rest for a preselected number of hours. Due to the requirement to pull off the road, the driver may not be able to stop at a location having shore power. Therefore, in prior art systems, trucks were required to run the engines to operate the air conditioning system and provide suitable conditions to acquire rest.

Subsequently, environmental concerns have also required that systems be developed which do not require idling of the truck in order to operate the air conditioning. This is in reaction to desires to decrease engine pollution which has, in part, been associated with idling engines.

Thus, there is a desire to provide improved environmental conditions by reducing wasted fuel and emissions associated with solely running an air conditioning system. Further, there is a competing need to provide an air-conditioning system when the truck engine is not operating to provide for driver comfort and rest.

Still further, with the desire to operate an air conditioning system solely on battery power when the truck engine is not operating, it is also desirable to provide a system which can utilize the battery power as efficiently as possible, to maintain desirable resting conditions for the driver for as long as possible.

Even further, in developing systems to meet the above criteria, it is also desirable to meet cooling capacity for various vehicles. There are various sizes of vehicles requiring differing cooling capacities. Accordingly, the ability to accommodate various cooling capacities without requiring a large number of additional parts would be desirable both for manufacturing and service and repair.

The information included in this Background section of the specification, including any references cited herein and any description or discussion thereof, is included for technical reference purposes only and is not to be regarded subject matter by which the scope of the invention is to be bound.

SUMMARY

In view of the preceding, the present embodiments provide a parking cooler which may be operated from battery power. Further, the system should have cooling capacities which may vary so as to accommodate different levels of cooling desired for a truck cabin. Further, present embodiments have features which improve the life of the batteries when the vehicle engine is not operating.

According to some embodiments, a mobile air conditioning system comprises a housing having an interior space for positioning of cooling mechanicals, the cooling mechanicals including at least a DC brushless variable speed compressor, an expansion valve, an evaporator and at least one condenser. The interior space of the housing may be arranged such that the at least one first condenser is arranged at one side of the interior space and a second symmetrically opposite side of the interior space is available and capable of receiving a second condenser to increase cooling capacity of the cooling mechanicals.

Optionally, the housing is a single housing and may further comprise a controller mounted on a printed circuit board. The mobile air conditioning system may further comprise an air distribution assembly connected to the housing. The air distribution assembly may have an air intake register and an air output vent. In some embodiments, the housing may be two housings. A controller may be mounted on a printed circuit board. The evaporator may be mounted in a first housing of the two housings. The compressor and the at least one condenser may be mounted in a second of the two housings. An air distribution assembly may be connected to the first housing. In some embodiments, the mobile air conditioning system may further comprise the second condenser. The second condenser may have substantially the same capacity as the at least one first condenser. The second symmetrically opposite side of the interior space may be empty. The air conditioning system may have a different capacity than the second condenser. In some embodiments, the housing may include a first housing that is adjacent to a second housing. Alternatively, the first housing may be spaced from the second housing. In either embodiment, one of said first or second housings may be located inside of a cab of a vehicle.

In a further embodiment, a mobile air conditioning system may comprise a housing having a plurality of cooling mechanicals including a DC brushless variable speed compressor, an expansion valve, an evaporator and at least one condenser, and a printed circuit board disposed within the housing. The printed circuit board may include a microprocessor unit and an on-board driver which drives the DC brushless variable speed compressor, the on-board driver being in electrical communication with the DC brushless variable speed compressor. The printed circuit board may also be in electrical communication with an evaporator fan and at least one condenser fan. At least one cabin temperature and an outside temperature sensor may be in communication with the printed circuit board.

Optionally, the housing being a single housing or the housing may be a first housing and a second housing. The printed circuit board in remote communication with a display. The printed circuit board may receive power from a vehicle. The printed circuit board receiving 12V DC or 24V DC power. The printed circuit board may provide a speed signal to the evaporator fan and the at least one condenser fan. The printed circuit board may receive a tachometer feedback signal. The mobile air conditioning system may further comprise at least one communication port on the printed circuit board for communication with the at least one condenser fan. The mobile air conditioning system may further comprise a second condenser and second condenser fan. At least one communication port may also in communication with the second condenser fan. The second condenser and the first condenser may be symmetrically arranged within the housing. The system may further comprise a compressor temperature sensor in communication with the printed circuit board. The mobile air conditioning system may further comprise a battery voltage sensor in communication with the printed circuit board.

In a further embodiment, a controller for an air conditioning system may comprise a printed circuit board having a substrate including a plurality of electrical communication paths, a motor of a variable speed compressor driven from said printed circuit board, the printed circuit board determining if actuators and sensors are in electrical communication with the printed circuit board, a communication bus which receives input of a plurality of parameters from a display printed circuit board and, wherein the plurality of parameters defining control values for the actuators.

Optionally, the control values may be stored on a display printed circuit board. The display printed circuit board may send the control values to the printed circuit board. In other embodiments, the control values may be stored on the printed circuit board. The printed circuit board may receive a signal corresponding to one of the parameters from a display circuit board. The control values may correspond to speed settings for the actuators. The controller may be utilized with air conditioning systems of various capacity. The controller may further comprise a converter which steps up voltage. The actuators may include at least one condenser fan, an evaporation fan and the variable speed compressor. The sensors may comprise a cabin temperature sensor, an outside temperature sensor, and a compressor temperature sensor. The sensors may comprise a battery voltage sensor isolated from other power. The actuators may further comprise a condensate water pump. The sensors further comprise a water level sensor. The controller may further comprise a DC-DC converter. The parameters may include a selection of at least one of automatic mode, economic mode and manual mode. The parameters may further define fan speeds and compressor motor speed. The parameters may further comprise a boost mode. In the boost mode, at least one of the evaporator fan speed, condenser fan speed and compressor speed may be maximized.

All of the above outlined features are to be understood as exemplary only and many more features and objectives of a parking air conditioning system or cooler may be gleaned from the disclosure herein. Therefore, no limiting interpretation of this summary is to be understood without further reading of the entire specification, claims and drawings, included herewith.

BRIEF DESCRIPTION OF THE DRAWINGS

In order that the embodiments may be better understood, embodiments of the parking cooler will now be described by way of examples. These embodiments are not to limit the scope of the claims as other embodiments of the parking cooler will become apparent to one having ordinary skill in the art upon reading the instant description. Non-limiting examples of the present embodiments are shown in figures wherein:

DETAILED DESCRIPTION

Figure 1:
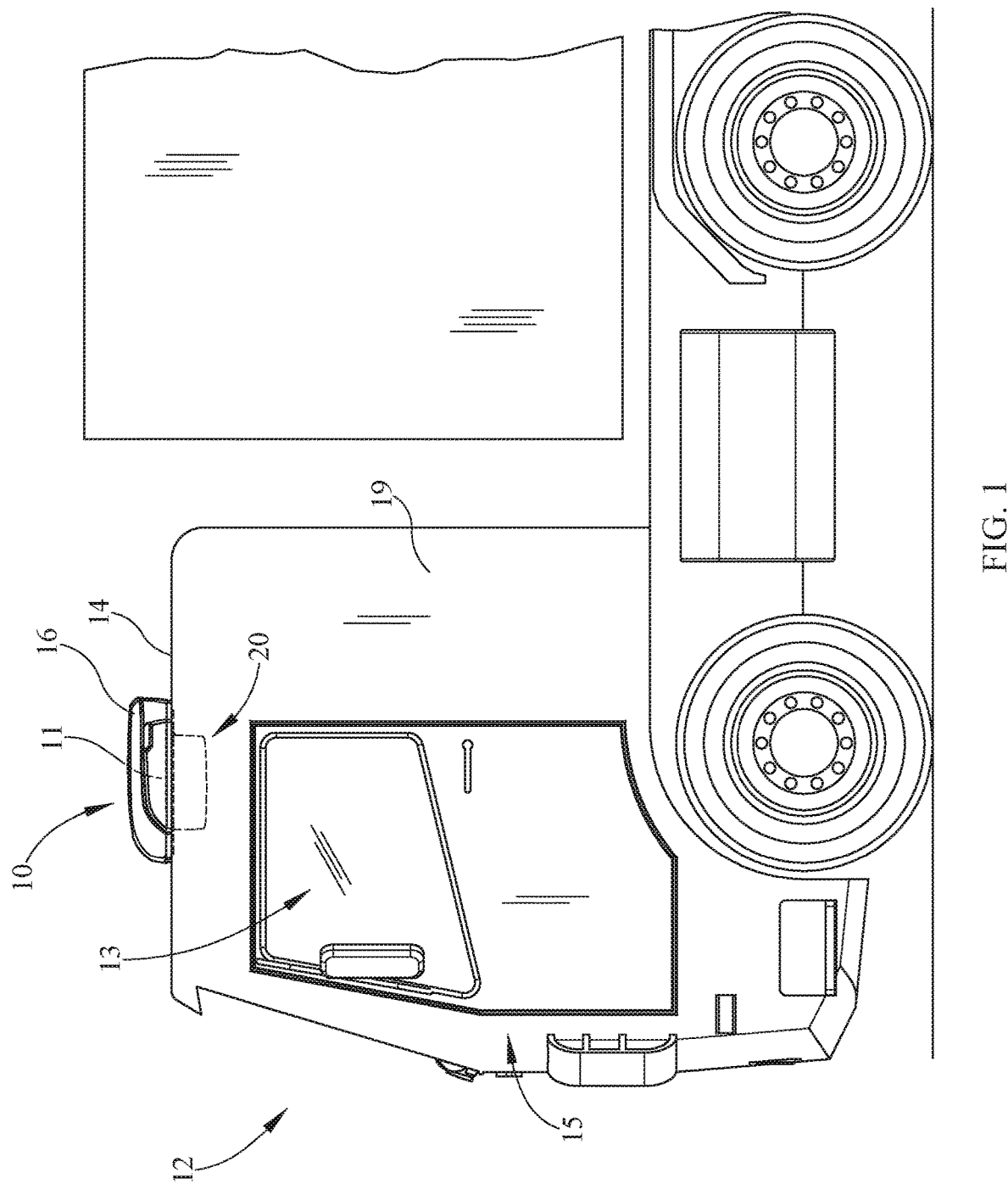
FIG. 1 is a side schematic view of one embodiment of a mobile air conditioner for parking cooling with a single housing.

It is to be understood that the parking cooler is not limited in its application to the details of construction and the arrangement of components set forth in the following description or illustrated in the drawings. The embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in the FIGS. 1-10 various embodiments of a mobile air conditioning system which provides parking cooling. The present embodiments may be located in one housing or in a split-apart housing arrangement. The housing is sized to be capable of working with various capacities of cooling mechanicals so that vehicles of differing sizes or of varying cooling needs may be satisfied. Additionally, the air conditioning system may be battery powered and the variable speed compressor may be driven by a driver which is on-board, a printed circuit board which controls the air conditioner rather than from a separate external driver, for example on-board the compressor. Features are provided for controlling the mobile air conditioning system to prolong battery life for longer rest intervals with conditioned air.

Thus, the air conditioning provided by the parking cooler is independent in operation of the engine operation status, for example, on or off.

Referring now to FIG. 1, a side schematic view of a mobile air conditioning system or parking cooler 10 is shown mounted on a vehicle 12, for example an over-the-road hauling truck. The truck may have a gas or diesel combustion engine 15 which is connected to a transmission for driving one or more pairs of wheels. At a forward end of the vehicle 12 is a cab or cabin 13 wherein the vehicle 12 may be driven and/or wherein a driver may sleep. The cab 13 may be over the engine 15, as depicted, or the engine may be forward of the cab. Additionally, some vehicles may further comprise a sleeper 19 wherein the driver or co-driver/passenger may rest.

The mobile air conditioning system 10 is shown mounted on a roof 14 of the vehicle 12 but may be mounted in other locations. The roof 14 of the vehicle 12 is generally shown as a flat roof or having a slight slope from back to front and/or side to side. However, in other embodiments, the roof may be sloped, for example up to some pre-defined limit. Such limitation may be in part dependent upon truck design as well as mounting configurations and capabilities of the compressor. Further, the mobile air conditioning system 10 may be positioned behind a cowling (not shown), for example which are sometimes desirable to improve aerodynamics of the vehicle 12.

Figure 7:
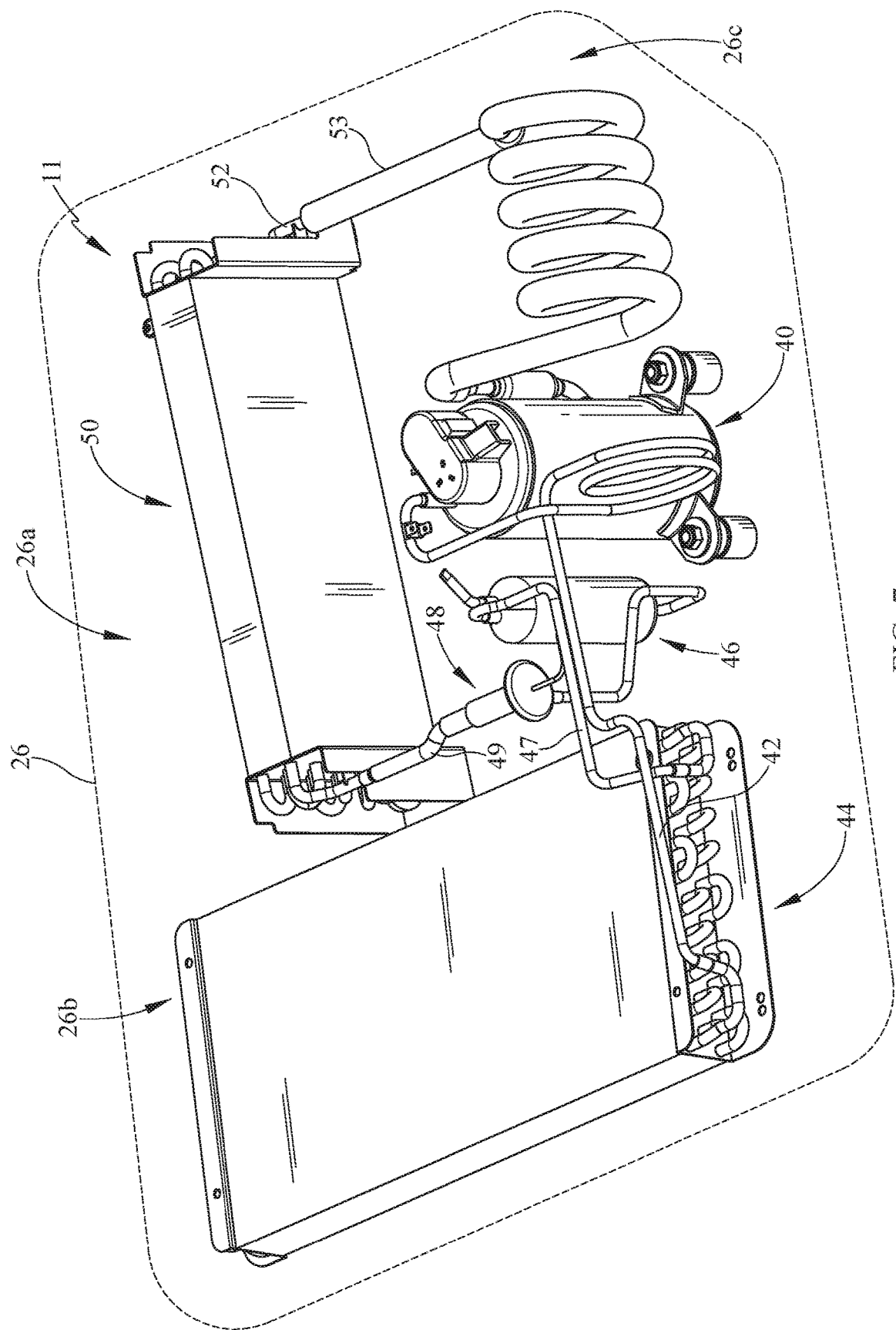
FIG. 7 is a perspective view of one embodiment of the cooling mechanicals.

The mobile air conditioning system 10 may be embodied by a single housing system or may be embodied by two or more housings. As shown in FIG. 1, the mobile air conditioning system 10 includes a single housing 16 which houses the cooling mechanicals 11. The cooling mechanicals 11 according to some embodiments may include a printed circuit board 310 (FIG. 9A) and controller 300 (FIG. 9A), a compressor 40 (FIG. 7), one or more condensers 44 (FIG. 7), an expansion valve 48 (FIG. 7), and an evaporator 50 (FIG. 7). In some embodiments, where a single housing is used, the housing 16 may extend through the vehicle roof 14 so that an air distribution assembly 20 is in flow communication with the housing and cycles air from the interior of the vehicle 12 through the housing 16 back into the vehicle 12. The air distribution assembly 20 may be formed with the housing 16 or may be connected to the housing 16 and extend through the roof 14 or vehicle wall or according to a non-limiting alternative, for example may sandwich or capture the roof 14 or other vehicle wall therebetween.

Figure 2:
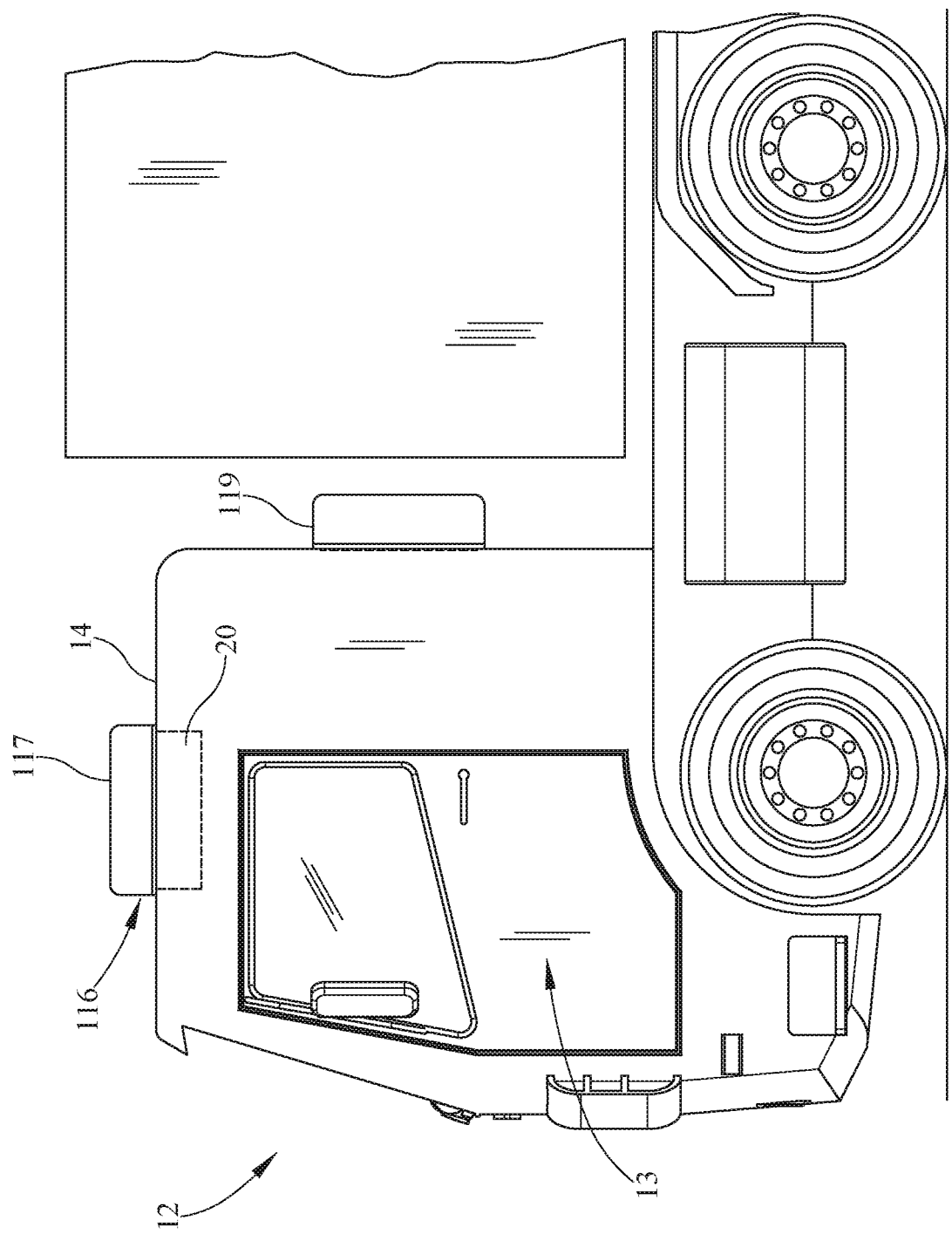
FIG. 2 is a side schematic view of a second embodiment of a mobile air conditioner for parking cooling with dual housings.

Referring now to FIG. 2, a side view of an alternative configuration is depicted. In this embodiment, the housing 116 is defined by two housings 117, 119. The first housing 117 is shown mounted on the roof 14 of the vehicle 12. The second housing 119 is shown mounted on the rear of the vehicle 12. The cooling mechanicals 11 may be split between the two housings 117, 119. The first housing 117 may be disposed on a flat or sloped roof, or may be mounted behind a cowling as described in previous embodiments. Further, the first housing 117 may have at least an evaporator and a printed circuit board with attached controller therein. An air distribution assembly 20 may be depending from the first housing 117 and may be integrally formed with the first housing 117 or may be connected to the first housing 117. The air distribution assembly 20 directs cabin air to the evaporator for heat exchange or alternatively, the evaporator may extend into a portion of the air distribution assembly 20 for heat exchange therein.

In the example embodiment, the second housing 119 may have the at least one condenser 44 (FIG. 7) therein and the compressor 40 (FIG. 7). An expansion valve 48 (FIG. 7) may be located in either of the first or the second housings 117, 119. In some embodiments, it may be desirable to locate the expansion valve 48 near or in the housing 117, 119 having the evaporator. Further, the cooling mechanicals 11 located in the second housing 119 are in fluid communication with the cooling mechanicals 11 of the first housing 117 so that refrigerant may flow between. The flow path may be internal to the vehicle 12 or may be external to the vehicle 12.

As one skilled in the art will understand, the refrigerant is compressed by the compressor 40, then moves to the at least one condenser 44 where the high pressure gas is cooled by the condenser with external air. As this occurs, the refrigerant may change phases from a gas to a liquid at which time, the refrigerant next passes through an expansion valve 48 and changes from a high pressure to a lower pressure fluid, for example a liquid. The low pressure refrigerant next passes to the evaporator 50 and heat is exchanged to the refrigerant from cabin air passing over the evaporator coils. The conditioned cabin air then travels back to the cabin as conditioned air for cooling and/or dehumidifying. This refrigerant circuit may be used in either of the single housing 16 embodiment or the multiple housing 116, 216 embodiments.

Figure 3A:
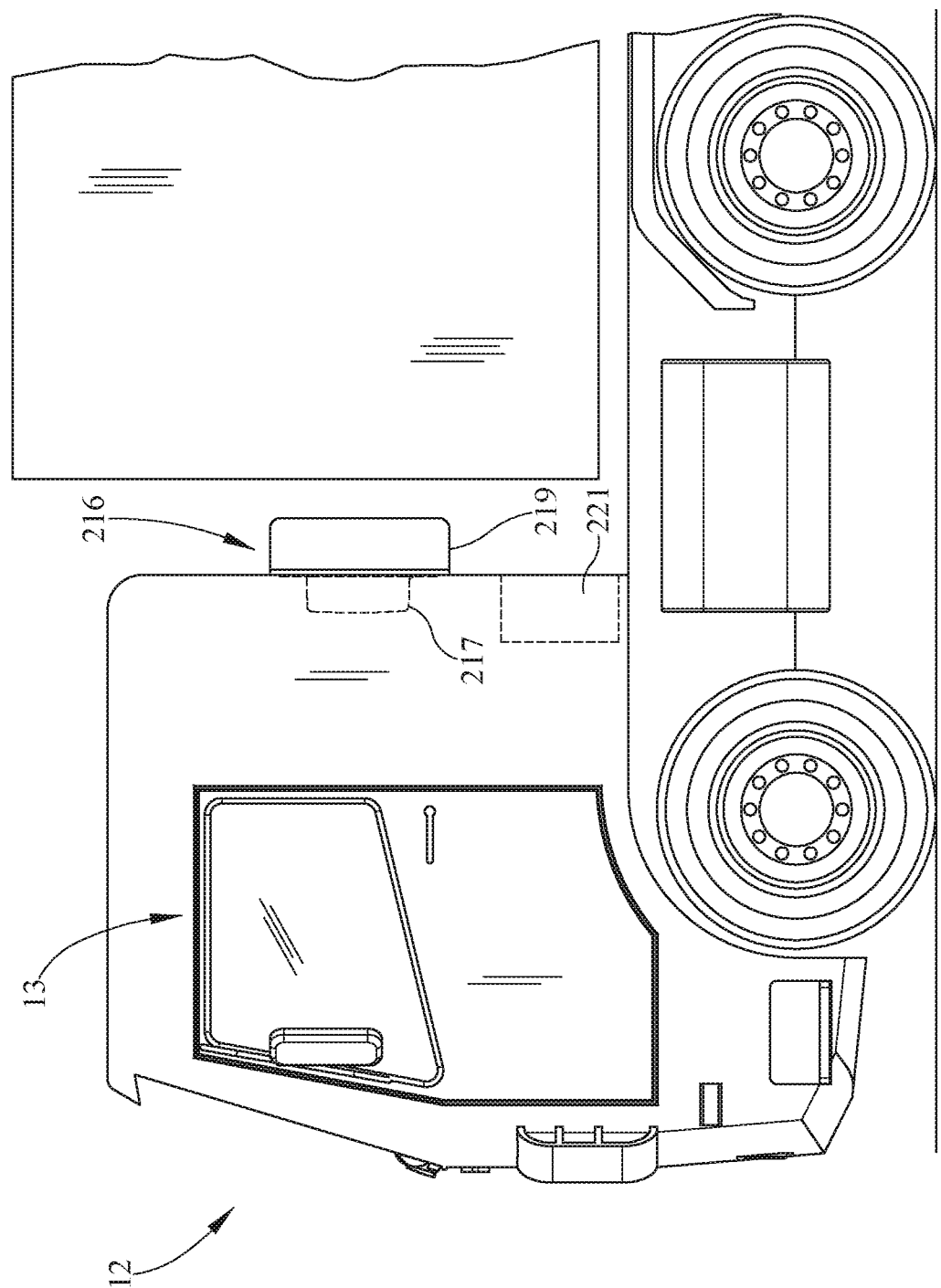
FIGS. 3A-3C are further embodiments of a mobile air conditioner for parking cooling with in various configurations.
Figure 3B:
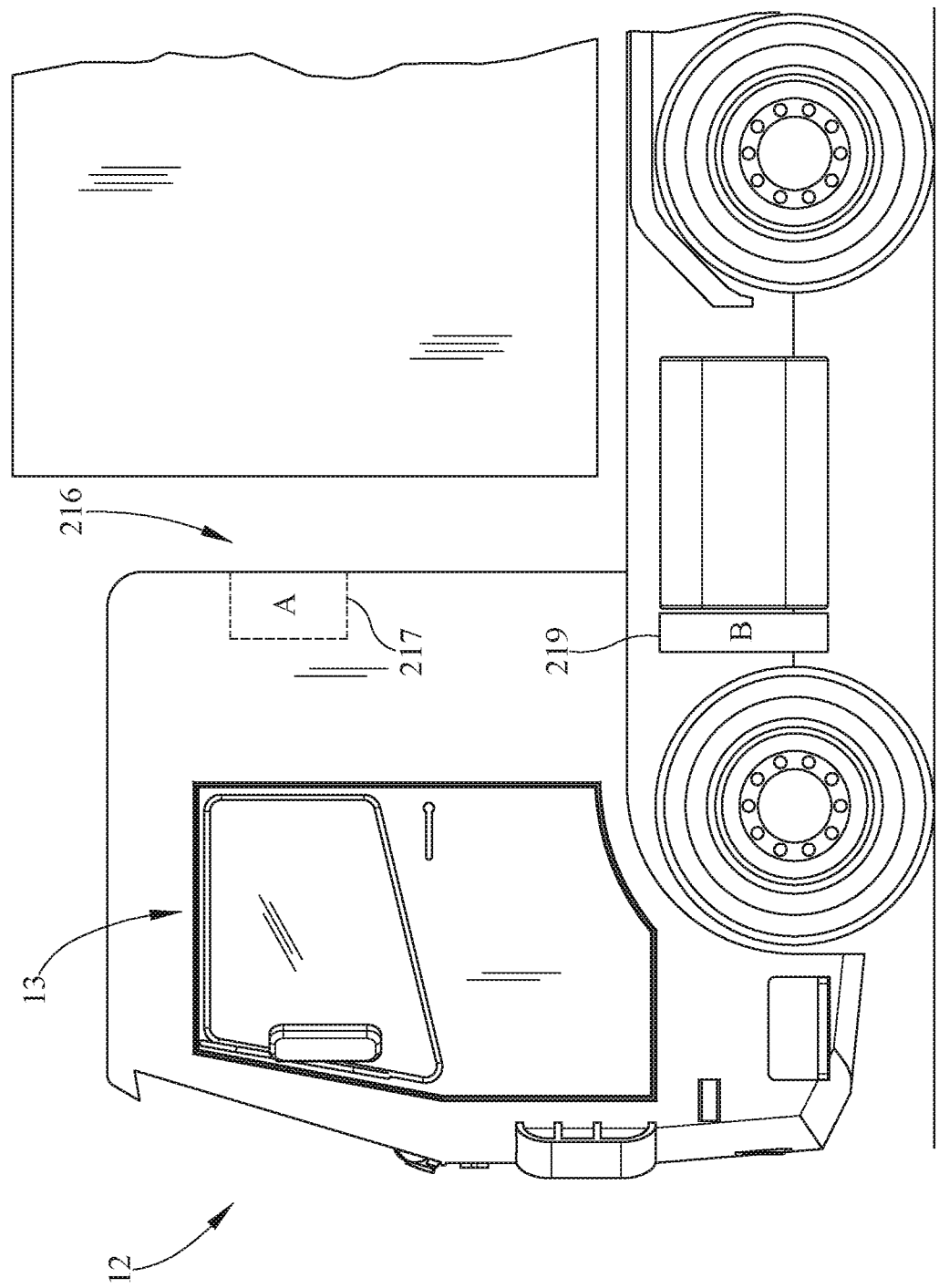

Referring now to FIG. 3A, a further side schematic view of an additional embodiment is depicted. In this embodiment, a housing 216 is shown disposed on the rear wall of the vehicle 12. The housing 216 may be a dual housing comprising an internal housing 217 and an external housing 219. In this embodiment however, the dual housings 217, 219 may be located adjacent to each other so that the two housings are not split apart or remotely located from one another as in the previous embodiment. Further, in alternate embodiments, the internal housing 217 may be spaced apart or located remotely from the external housing 219. For example, as shown and labeled an optional internal housing 221 is shown mounted on the interior and/or on the rear wall of the vehicle cab 13.

Figure 3C:
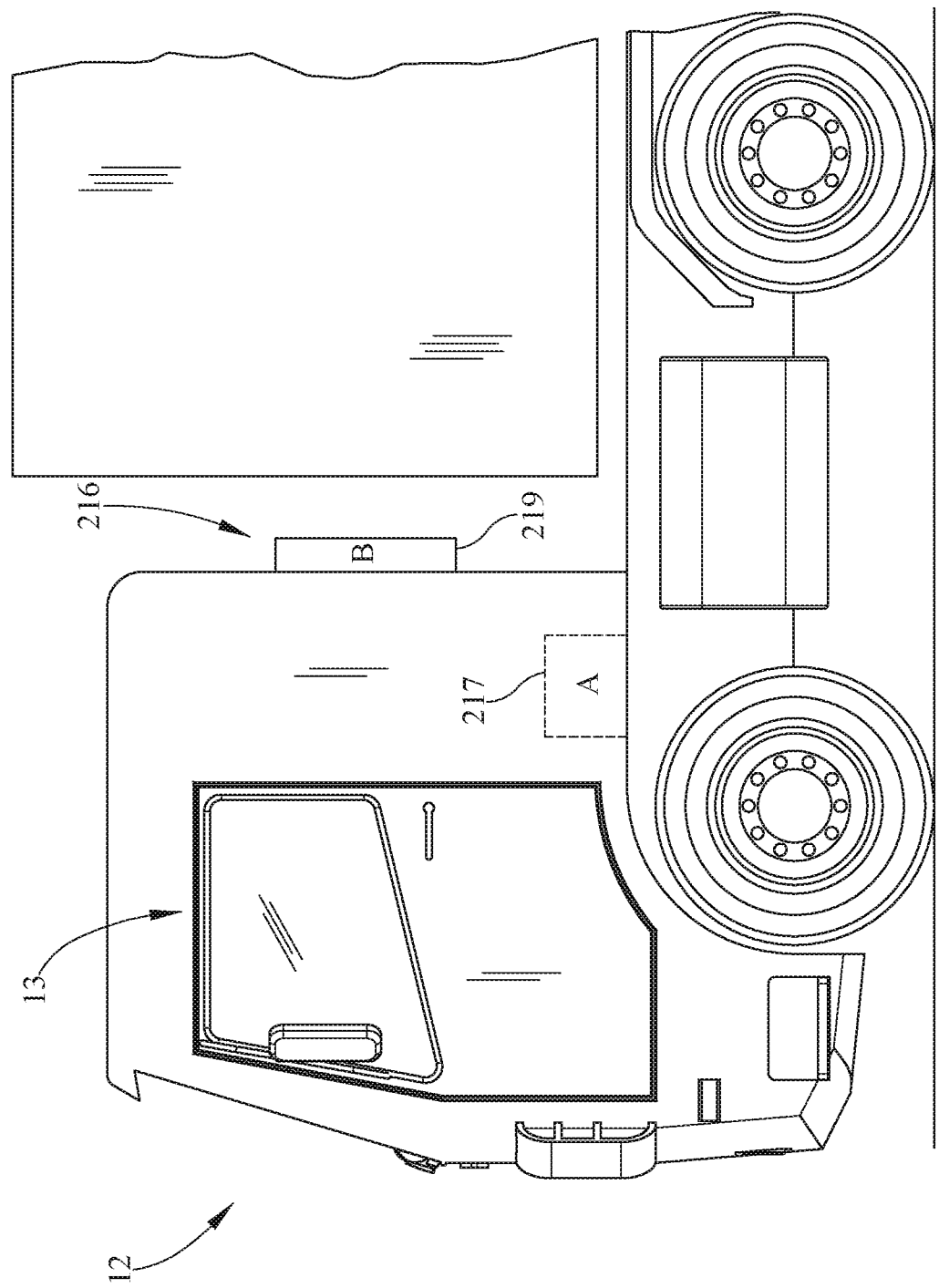

Other locations may be suitable for remote locating, but the rear of the cab 13 provides the conditioned air in a location suitable for cooling the resting person for example in the sleeper area 19 of the cab 13. For example, with reference to FIG. 3B, another embodiment is shown wherein the housing 216 is defined by an internal housing 217 and an external housing 219. In such embodiment, the internal housing 217 is located in the cab 13, specifically in the rear of the cab 13 wherein closest to an area where a person might sleep. In this embodiment, the external housing 219 is located on a lower exterior area of the vehicle 12. For example, in this embodiment, the external housing 219 may be located adjacent to the fuel tank or connected to the frame of the vehicle 12. In this embodiment, the internal housing 217 may include an evaporator coil, evaporator fan and a controller, for example. The external housing 219 may include a compressor, condenser coil and condenser fan, for example. With reference to FIG. 3C, the external housing 219 is shown mounted in the cab 13 and indicative that the internal housing 217, if utilized, may be mounted in a plurality of locations as referenced in comparison to FIG. 3A.

Figure 9A:
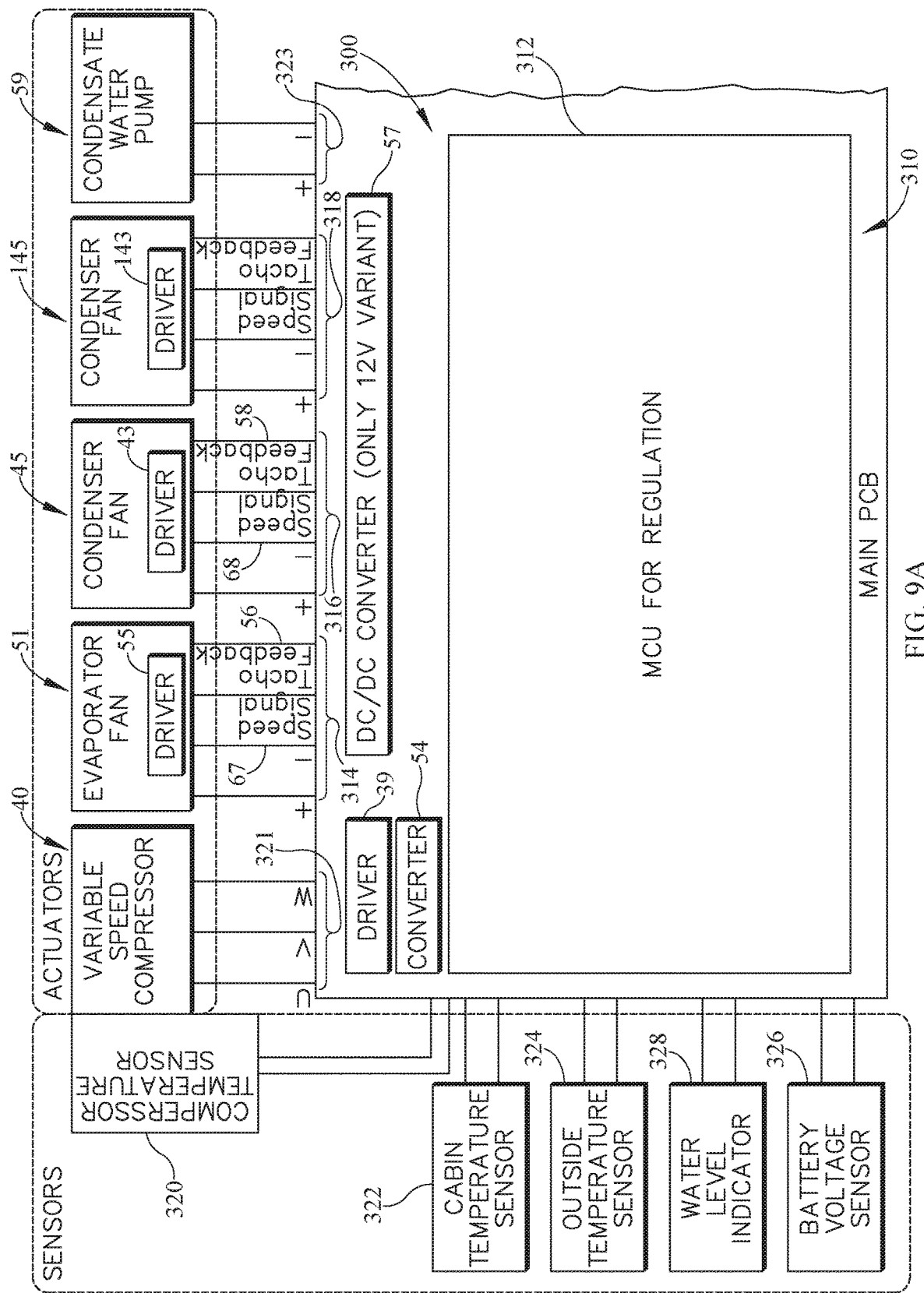
FIGS. 9A and 9B are a schematic view of various components of the parking cooler; and, FIG. 10 depicts a flow chart of a method of using the parking cooler.
Figure 9B:
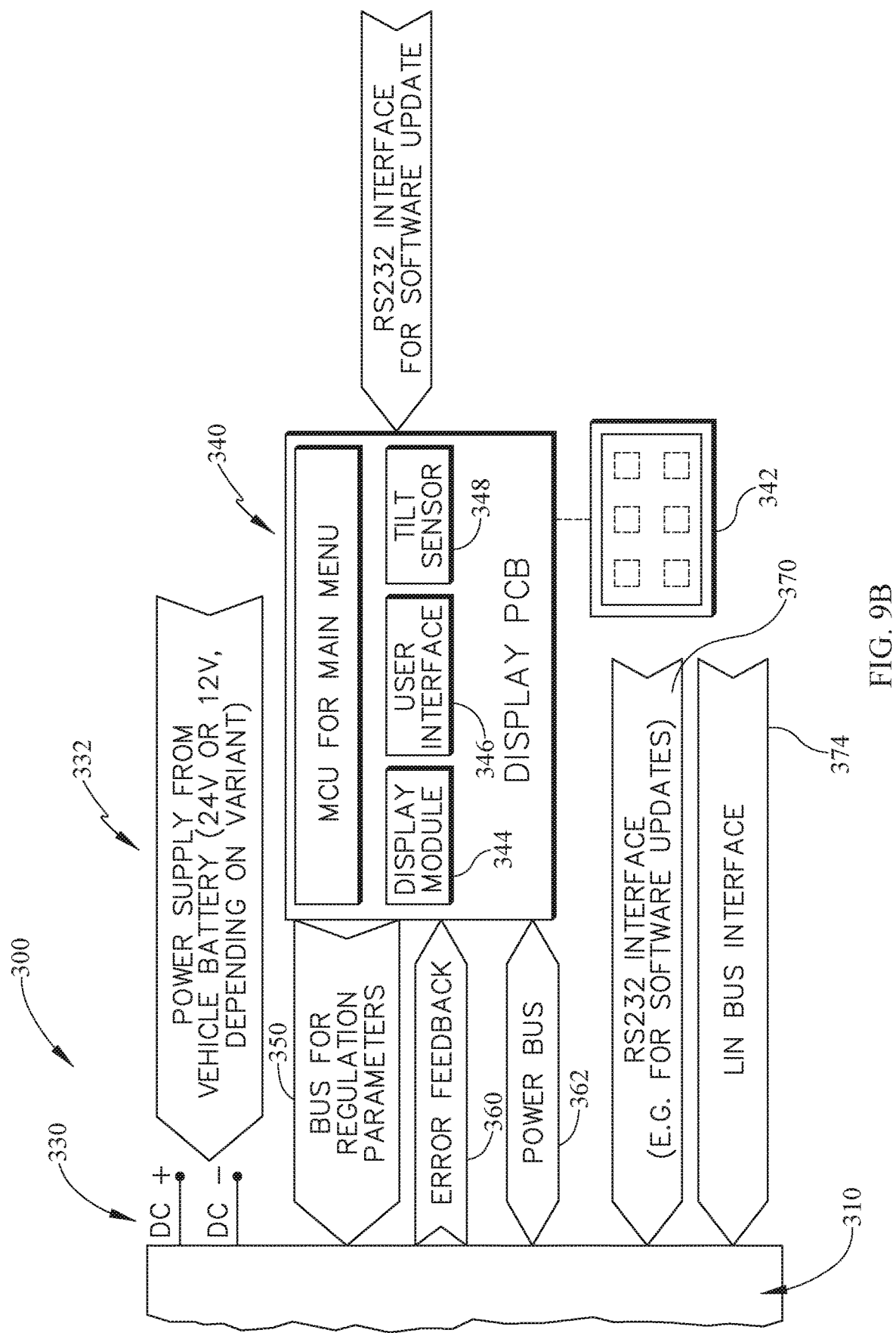

According to the instant depicted embodiment of FIG. 3A, the internal housing 217 may comprise the evaporator 50 (FIG. 7) and the printed circuit board 310 (FIG. 9B) with attached controller 300 (FIG. 9B). Further, the second external housing 219 may include the compressor 40, condenser 44 and condenser fan 45. The fluid connection for refrigerant may be internally maintained passing through the interface between the internal and external housing 217, 219.

On any of the depicted embodiments, the air conditioning system 10 may also include a display 342 (FIG. 9B) having a distinct printed circuit board 340 (FIG. 9B) for operation of such. The display 342 may allow for a user interface and include input for user adjusted set point inputs such as temperature. The inputs may include buttons or may include quasi-buttons defined on a touch screen, for example. Other embodiments of user input may be used as well. The display 342 will also provide the user with error messages, for example if there is a low battery level, low refrigerant level or other issue or error condition.

Figure 4:
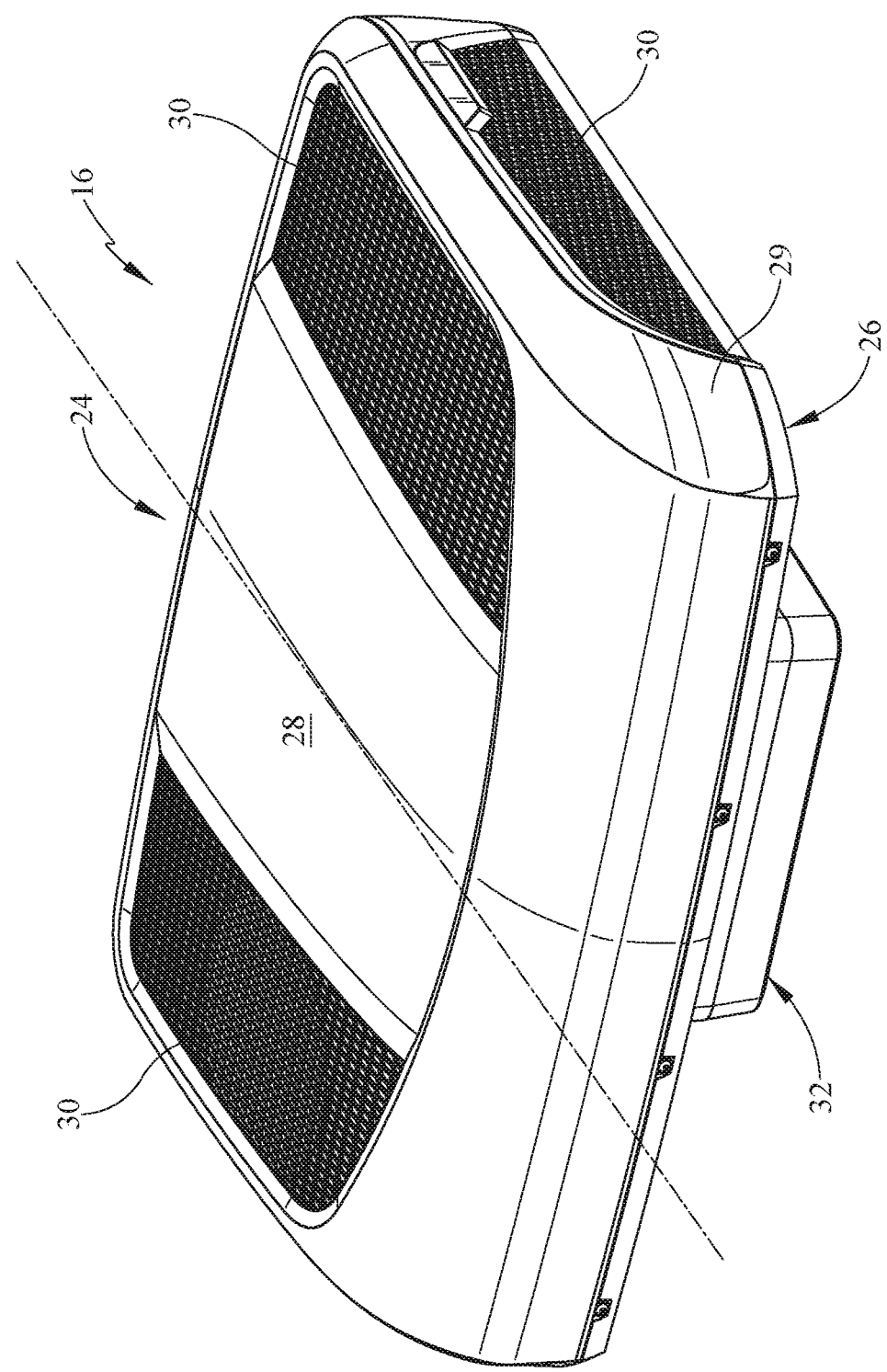
FIG. 4 is a perspective view of one embodiment of a housing which may house one or more symmetrically positioned condensers.

Referring now to FIG. 4, a perspective view of an exemplary housing is shown. In the previous embodiments, the housings have been shown schematically. The instant housing may be housing 16, 116, or 216 but will be numbered housing 16 for ease of this description. The housing 16 includes a shroud 24 and a base 26. The shroud 24 may have at least one top surface 28 and at least one sidewall 29. Along one or more of the surfaces 28, 29 may be vent grills or registers 30 for exchanging heat of the condenser with the atmosphere.

At the front of the housing 16, the housing is curved downwardly from the top surface. This aids in aerodynamic performance of the housing 16 as well as providing an aesthetically pleasing appearance. Further, as shown in the view, the housing 16 includes two grills 30 on each lateral side, that is either side of the axis shown in broken line. The grills 30 are located adjacent to locations of at least one condenser to aid in heat exchange of the refrigerant.

The housing 16 is a single housing meaning all of the cooling mechanicals 11 of the air conditioning system 10 are located therein. As previously indicated, the cooling mechanicals 11 may include at least one condenser 44. The ability to add more than one condenser increases cooling capacity of the air conditioning system 10. In order to provide for such ability to add additional condensers, the housing 16 or housing 119, 216 may be formed symmetrically, for example about the axis extending from front to rear. Thus the grills 30 are located at each lateral end, symmetrically to allow for one, or for example two, condensers. The housing 16 has cooling mechanicals 11 arranged for symmetrical configuration if more than one is utilized and therefore the housing 16, may be formed of a symmetrical shape to receive one or more than one condenser.

Depending from a lower portion of the base 26 is a duct 32. The duct 32 may be in fluid communication with an air distribution assembly within the vehicle 12. The duct 32 may be partitioned to separate a first air flow, for example to the evaporator 50 (FIG. 7) and a second air flow, for example from the evaporator 50. In other embodiments however, multiple housings may be utilized wherein the evaporator 50 is spaced and remote from the one or more condensers.

Figure 5:
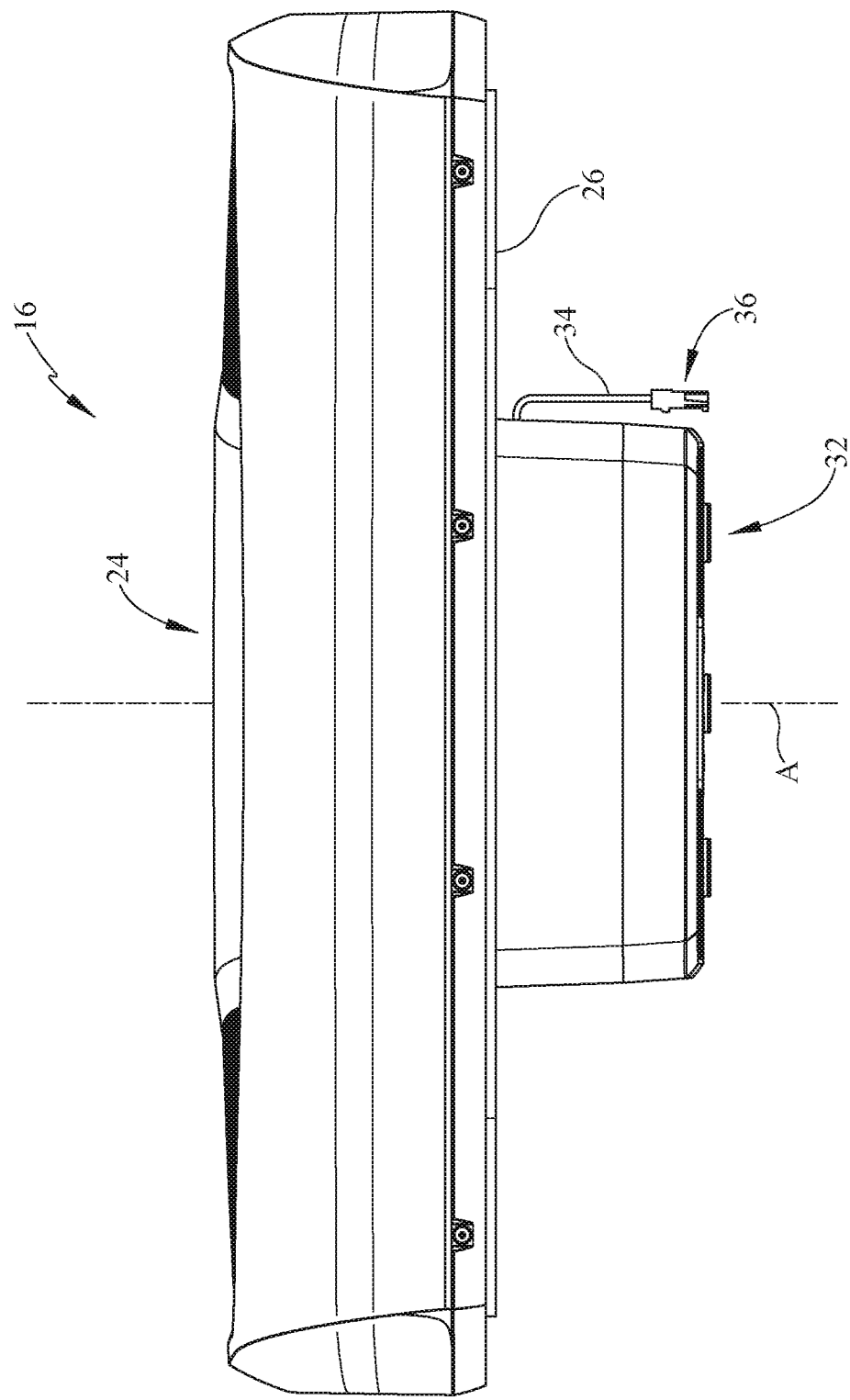
FIG. 5 is a front view of the example housing of FIG. 4.

Referring now to FIG. 5, a front view of the housing 16 is shown. Again, the housing 16 is shown as symmetrical about an axis which is shown as a broken vertical line in this embodiment. Thus the housing 16 may also be symmetrical about an axis extending into and out of the page as shown in the FIG. 4 and about the vertical axis of FIG. 5, also shown in broken line. Further, if a dual housing configuration is utilized, the housing having the at least one condenser may have the symmetrical shape. Still further, the condensers, if two are utilized, may be arranged symmetrically therein. This ability to use one or more condensers allows the ability to increase capacity of cooling as opposed to the use of a single condenser.

Also, extending from the base 26 is the duct 32 for communication with an air distribution assembly within the vehicle 12. Adjacent to the duct 32, a wire 34 and connector 36 are shown. The wire 34 may have power and control conductors in communication with other components, for example the display printed circuit board 340 (FIG. 9B) and/or other features such as the condenser fans 45 (FIG. 9A) or a compressor 40. Further, the connector 36 may be in electrical communication with control(s) which may be located on the air distribution assembly.

Figure 6:
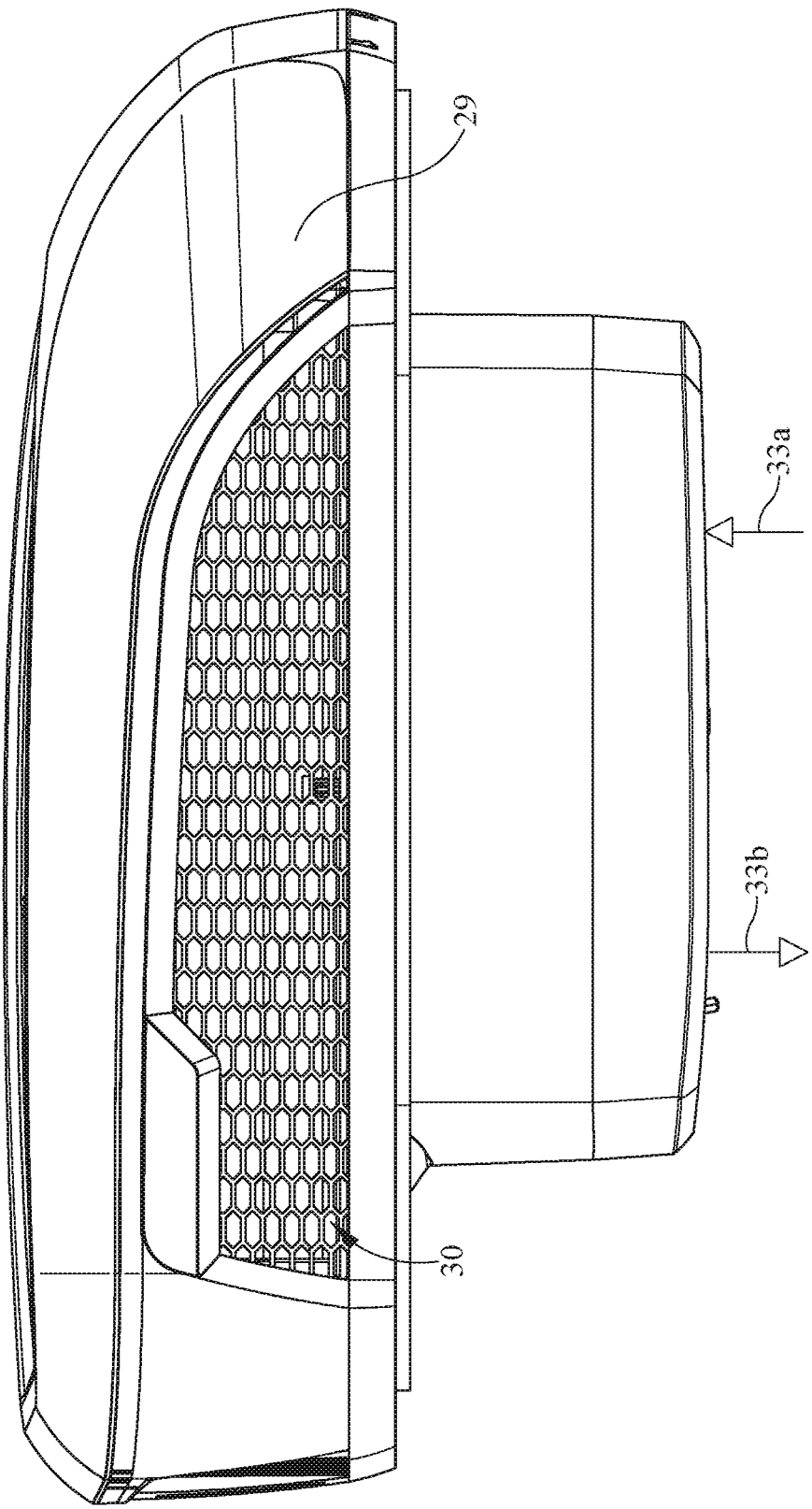
FIG. 6 is a side view of the example housing of FIG. 4.

Referring now to FIG. 6, a side view of the example housing 16 embodiment is shown. The sidewall 29 is shown with a sidewall grill 30 to aid in heat exchange from the at least one condenser 44 (FIG. 7). The opposite sidewall 29 may be formed in symmetrical fashion as seen in FIG. 4, for use with an additional condenser if desirable. Additionally in this view, the duct 32 may also be divided to provide airflow to and the evaporator 50. For example, the duct 32 may comprise an air intake register and air output vent represented respectively by flows 33a, 33b.

Referring now to FIG. 7, a perspective view of one embodiment of the cooling mechanicals 11 are shown. According to some aspects, the present embodiments may be expandable to add additional condensers. The housings, for example, 16, 119, 219 wherein the condensers 44 may be housed are formed to accept one condenser or to be capable of accepting additional condensers in symmetrical arrangement or configuration. In the depicted embodiment, the base 26 is shown in broken line providing an outline of an interior space 26a and the condenser 44 on one side 26b. On an opposite side 26c, there is an open area which may receive an additional condenser to increase cooling capacity.

In the instant embodiment, cooling mechanicals 11 including the compressor 40 is shown in fluid communication with the at least one condenser 44. The compressor 40 is driven by a DC brushless motor which is capable of variable speed operation. The compressor 40 is connected to the condenser 44 by a fluid conduit 42 which provides fluid communication from the compressor 40 to the condenser 44. A second conduit 47 is in fluid communication between the condenser 44 and an expansion valve 48. An optional fluid vessel 46, for example a separator, is shown disposed between the condenser 44 and the expansion valve 48 and may be used to receive fluid from the condenser 44 and an optional additional second condenser (not shown) if the second condenser is utilized. The separator 46 is in fluid communication with the expansion valve 48. The separator 46 may separate gas form of the refrigerant from liquid refrigerant before the fluid refrigerant continues to the expansion valve 48.

Extending from the expansion valve 48 is a fluid conduit 49 which provides a fluid input to the evaporator 50. The evaporator 50 includes a plurality of coils therein which serpentine and are in flow communication with the duct 32 to bring air to the evaporator 50 and pass air over the coils and condition the air so that the conditioned air can pass back into the cabin 13 (FIG. 1). Both the condenser 44 and evaporator 50 may include fans to increase heat transfer.

At a second location of the depicted evaporator 50, a second conduit 52 extends from the evaporator 50 to return refrigerant from the evaporator 50 to the compressor 40. The conduit 52 is shown wrapped in an insulator 53 and returns to the compressor 40 to complete the fluid circuit. The insulator 53 may be formed of various materials but in some embodiments is formed of closed cell foam or synthetic rubber, for example CFC or HCFC.

In operation, as described previously, the vapor-compression cycle uses a circulating liquid refrigerant as the medium which absorbs and removes heat from the space to be cooled such as the cabin air and subsequently rejects that heat elsewhere for example at the condenser 44. Circulating refrigerant enters the compressor 40 in the thermodynamic state known as a saturated vapor and is compressed to a higher pressure further resulting in a higher temperature. The hot, compressed refrigerant vapor is then in the thermodynamic state known as a superheated vapor and it is at a temperature and pressure at which it can be condensed with either cooling water or cooling air. That hot vapor is routed through the condenser 44 where it is cooled and condensed into a liquid by flowing through a coil or tubes with air flowing across the coil or tubes. This may be forced air, for example by way of a fan (not shown). In the condenser 44, the circulating refrigerant rejects heat from the system and the rejected heat is carried away to atmospheric air. The condensed liquid refrigerant, in the thermodynamic state known as a saturated liquid, is next routed through the expansion valve 48 where it undergoes a reduction in pressure. That pressure reduction results in the adiabatic flash evaporation of a part of the liquid refrigerant. The auto-refrigeration effect of the adiabatic flash evaporation lowers the temperature of the liquid and vapor refrigerant mixture to where it is colder than the temperature of the enclosed space to be refrigerated. The cold mixture is then routed through the coil or tubes in the evaporator 50. A fan 51 (FIG. 9A) circulates the warm air of the vehicle cabin 13 across the evaporator coils or tubes carrying the cold refrigerant liquid and vapor mixture. That warm air evaporates the liquid part of the cold refrigerant mixture. At the same time, the circulating air is cooled and thus lowers the temperature of the enclosed space to the desired temperature as such cabin air is returned through the duct 32 (FIG. 5). The evaporator 50 is where the circulating refrigerant absorbs and removes heat which is subsequently rejected in the condenser and transferred elsewhere by the water or air used in the condenser 44. To complete the refrigeration cycle, the refrigerant vapor from the evaporator 50 is again a saturated vapor and is routed back into the compressor 40.

Various refrigerant types may be utilized. In some embodiments, R-134A is utilized as a refrigerant. However this is non-limiting as others may be used including but not limited to R-11, R-12, HCFCs such as R-22 and HFCs R-134a, which is used in many vehicles. HCFCs are being phased out under the Montreal Protocol and replaced by hydrofluorocarbons (HFCs), such as R-410A, which lack chlorine. Still further, newer refrigerants may include supercritical carbon dioxide, known as R-744. These have similar efficiencies compared to existing CFC and HFC based compounds, and have lower global warming potential. These are merely examples however as other refrigerants may be used.

Various types of compressors may be utilized. In some embodiments, reciprocating compressors are used. In some other embodiments, rotary screw compressors may be used, or centrifugal compressors, scroll compressors, diaphragm, or axial flow. In any of these types, it is desirable that the compressor be driven by a variable speed motor. In some embodiments, the motor may be a DC brushless variable speed motor so that the speed of the compressor rotation may be varied. According to some embodiments, the compressor 40 may operate between 1200 RPM and 3600 RPM however other speeds, accelerations and ranges may be utilized.

The present embodiments may vary the speed of the compressor 40 in order to decrease power consumption of the battery and extend battery life. The speed decrease may be related to various factors including but not limited to a comparison of the set point temperature and the actual temperature so that as the differential between the two temperatures decreases, the compressor power consumption decreases by decreasing speed of the motor of the compressor 40. In other embodiments however, the temperature differential may be used in combination with other factors such as remaining power in the battery or batteries, the pressure of the refrigerant and/or other factors.

Further according to some embodiments, the condenser 44 may be a 1000 W condenser including at least one condenser fan, to exchange heat to atmosphere. According to some embodiments, the heat rejection should be higher than the desired cooling capacity. For example, if 1000 W of cooling is desired, then 1300 W of heat rejection may be required. Further, if desirable, the user or manufacturer may add an additional condenser to an open space symmetrically opposed to the first condenser 44.

Figure 8:
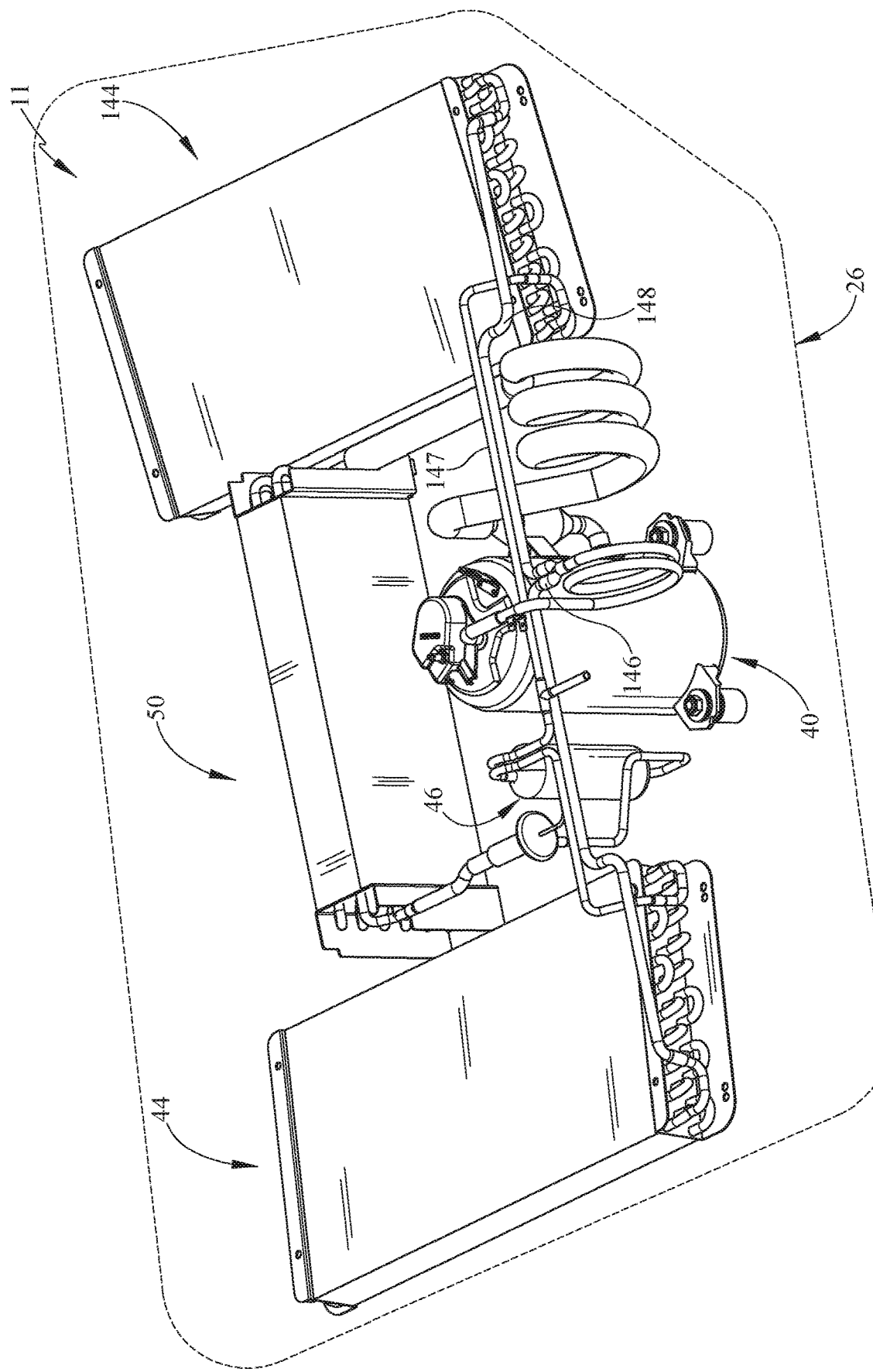
FIG. 8 is a perspective view of an alternate embodiment of the cooling mechanicals.

Referring now to FIG. 8, such further alternative embodiment is shown in perspective view. The present embodiment is shown with an additional condenser 144. The second condenser 144 is in fluid communication with compressor 40 at a Y-fitting 146 which splits the flow of refrigerant between the first and second condensers 44, 144. A conduit 148 extends from the fitting 146 to the second condenser 144. After passing through the second condenser 144, the refrigerant flow is directed to the vessel 46 through conduit 147.

According to this embodiment, the condensers 44, 144 may be substantially equivalent in capacity or alternatively may differ in capacity. The instant condensers 44, 144 may be of 1000 W capacity for a combined total of 2000 W. As mentioned previously, if 2000 W of cooling is desired, it may be necessary or desirable to reject a higher amount of heat, for example 2600 W. This is desirable for increased cooling capacity for the refrigerant and thus increasing the cooling capacity of the air conditioning system 10 as a whole. Further, the condensers 44, 144 are arranged symmetrically so that when placed within a single housing or a dual housing portion wherein the condensers are located, the condensers 44, 144 may be arranged in symmetrical fashion about one or more center lines of the housing. Further, the ability to add the second condenser 144 provides some modularity to the air conditioning system 10.

Referring now to FIGS. 9A-9B, a schematic view of an embodiment of various components of a parking cooler is shown, including a controller 300 mounted or otherwise coupled to a printed circuit board 310, including a microprocessor or microprocessor unit 312. The printed circuit board 310 may also have an on-board driver 39 for driving the motor of the variable speed compressor 40. The compressor 40 therefore does not require a separate on-board driver as is consistent with prior art devices. Further, the compressor 40, with direct connection to the printed circuit board 310, may limit losses associated with wiring, as well as distortion of power supply associated with power travel over distances of wiring. For example, in some embodiments at least a tacho or other feedback wire between the compressor 40 and the printed circuit board 310 may be omitted by provision of on-board driver 39. In some embodiments, the driver 39 may include, for example, an insulatedgate bipolar transistor (IGBT). For instance, the driver 39 may be a variable frequency drive that includes an IGBT.

The term "controller" is used herein generally to describe various apparatus relating to regulation of temperature. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various implementations include, but are not limited to, conventional microprocessors, application specific integrated circuits (ASICs), and field-programmable gate arrays (FPGAs).

In various embodiments, a processor or controller may be associated with one or more storage media (generically referred to herein as "memory" e.g., volatile and non-volatile computer memory such as RAM, PROM, EPROM, and EEPROM, floppy disks, compact disks, optical disks, magnetic tape, etc.). In some embodiments, the memory may be encoded with one or more programs that, when executed by the controller 300, perform at least some of the functions discussed herein. Memory may be fixed within a processor or controller or may be transportable, such that the one or more programs stored thereon can be loaded into a processor or controller so as to implement various aspects of implementations disclosed herein. In some embodiments, the memory may also be mounted or otherwise coupled to the printed circuit board 310.

The printed circuit board 310 also includes a plurality of inputs and outputs, generally ports 314, 316, 318, 321, 323, for connection to other components associated with or needing control. As shown in FIGS. 7 and 8, the condensers 44, 144 and evaporator 50 are located relative to other components within at least one housing 16 (FIG. 1) for example. As shown relative to the controller 300, various actuators are provided for the parking cooler which provide the proper cooling function. The actuators are shown within a broken line for purpose of description and comprise the variable speed compressor 40, as well as fans and a pump, according to some embodiments. The variable speed compressor 40 is shown having three conductors indicated as U, V, W each corresponding to one phase of 3-phase DC power to the variable speed compressor 40. At one end, the three conductors U, V, W are connected to the compressor 40 (e.g., directly to the motor of the compressor 40) and at the opposite end to the printed circuit board 310, and more specifically to phase outputs of the on-board driver 39.

The printed circuit board 310 also comprises a converter 54 which may step up voltage from 12 or 24 Volts to a higher voltage necessary to drive the motor of the variable speed compressor 40. For example, the converter 54 may step the voltage up to 180V for the three phase driving by the driver 39. The printed circuit board 310 may also optionally include a DC/DC converter 57. This converter 57 may be used, for non-limiting example, if the power supply is 12V and needs to be stepped up to a higher voltage, for operating fans of the evaporator and one or more condensers.

Further, depicted adjacent to the variable speed compressor 40 is an evaporator fan 51. The evaporator fan 51 may include an on-board driver 55 which is in communication with the printed circuit board 310 to drive a fan motor for the evaporator 50.

Still further, a condenser fan 45 is also shown on the schematic and included with the actuators. As previously described, the at least one condenser 44 is utilized and allows for expansion within the at least one housing 16 in order to provide added cooling capacity. The condenser fan 45 is also shown with an on-board driver 43 which is in electrical communication with the printed circuit board 310. Similarly, if a second or more condenser is utilized, a second condenser fan 145 and driver 143 may be in communication with the controller 300 and/or printed circuit board 310.

Each of the evaporator fan driver 55 and the condenser fan driver 43 are in electrical communication with the printed circuit board 310. Each of the drivers 55, 43 may have a positive and negative power connection and a speed signal connection 67, 68 which directs the drivers 55, 43 to drive the fans at a desired speed. Further, the drivers 55, 43 may include a feedback signal connection 56, 58 with the printed circuit board 310. The feedback signal connection 56, 58 may provide, for example a tachometer signal to the controller 300 to verify fan speeds.

Other optional features may be provided as well. As discussed previously, the at least one condenser 44 may be expanded to include a second condenser and condenser fan in a higher cooling capacity embodiment. Such actuator is depicted.

Still further, the condensate water pump 59 may be desired in the at least one housing 16 as well. The condensate pump 59 may be used to remove fluid from a housing interior in order to rid the fluid therein from building and creating further problems. The pump 59 may collect fluids located in the base 26 (FIG. 5) and pump them exteriorly, depending on the arrangement and orientation of the at least one housing 16 and the components therein.

Along the left side of the schematic printed circuit board 310, are a plurality of sensor inputs. Starting at the upper end of the schematic is a compressor temperature sensor 320. The compressor temperature sensor 320 is used to measure the temperature of the compressor 40 for various reasons including, but not limited to, overheat protection. If the temperature exceeds a specific temperature, the variable speed compressor 40 may be shut down to prevent permanent damage to the compressor 40. In some embodiments, shutting down the compressor 40 may include ceasing providing of power by on-board driver 39. For example, the controller 300 may determine an overheat condition based on input from compressor temperature sensor 320 and, in response to such detection, cause the on-board driver 39 to cease providing power.

Additionally, a cabin temperature sensor 322 is provided. The cabin temperature sensor 322 is shown in electrical communication with the printed circuit board 310. The cabin temperature sensor 322 is used to provide the cabin temperature to the controller 300 for use comparing the set point temperature input by the user, to the cabin (actual) temperature. Based on this comparison, the controller 300 may make a determination to increase or decrease speed of the compressor 40. When the differential between set point and actual temperature is higher, the compressor 40 may be run at higher speeds and/or more frequently in cycle to effectuate the desired cooling. However, as the differential decreases, the compressor speed may be reduced in order to reduce battery power usage and prolong the operation of the air conditioning system 10. Further, the increment of change of speed may also be varied. Such change in speed increment may be desirable to reduce the overshoot of a set point temperature when approaching such set point temperature. This provides more stable temperature approach and control and less oscillation above and below the set point temperature.

The controller 300 may also include an outdoor (ambient) temperature sensor 324. The air conditioning system 10 may have limitations on operating conditions, such as ambient temperature conditions being either too high or too low. The outdoor or ambient temperature sensor 324 will provide a temperature signal to the controller 300 from which the controller 300 may determine if ambient conditions are appropriate for operation.

A battery voltage sensor 326 may also be provided. The voltage sensor 326 may be directly connected to the one or more batteries so as to obtain an actual voltage level of the one or more batteries, which is not influenced by other components on the circuit. In other words a true reading may be provided of voltage, uninfluenced by other factors.

A water level indicator 328 may optionally be provided. The water level indicator 328 may also be utilized to provide a signal to the controller 300 in order to drive the optional condensate water pump 59. Thus, if water in the at least one housing 16 reaches a certain level, the indicator 328 signals the controller 300 which directs the condensate pump 59 to remove water from the housing 16.

Referring to the opposite side of the printed circuit board 310 is a power supply connection 330. A power supply 332 is shown adjacent to the connection 330 and may be a power supply from a vehicle battery or may be a battery pack which is separate of the vehicle starting system. The power supply 332 may be a DC power supply and may be a 12V or a 24V power supply.

Still further, a display printed circuit board ("PCB") 340 is shown. The display PCB 340 in some embodiments is operatively connected to a display 344 which may have discrete buttons or may have a touch screen for input of user commands. The display 344 may be connected to (e.g., mounted on) the display PCB 340 by wired connection or by wireless connection, such as where the display PCB 340 is disposed in a separate housing for non-limiting example. Such optional or alternative embodiment is shown as an alternative embodiment as display 342 connected by a broken line.

The display printed circuit board 340 may have modules for performing various functions. According to some embodiments, the printed circuit board may have a display module 344 to provide a user display or, in the alternative or additionally, to drive a remotely located display 342. The display module 344 may have a graphics processor as well as a display, such as for non-limiting example a liquid crystal display (LCD) or an LED display. Similarly, the remote display 342 if utilized, may also be of these or alternative display types. Additionally, the display printed circuit board 340 may include a user interface module 346 which receives input from buttons or touchscreen on the display 342. Still further, in some embodiments, the display printed circuit board 340 may include a tilt sensor 348. It may be desirable that the tilt sensor 348 be calibrated to confirm that the vehicle or at least one housing is not outside of a predefined angle for safe operation of the air conditioning system 10. Thus, the display PCB 340 may manage user input and user interface with the air conditioning system 10 to provide an aesthetically pleasing interface which is also functionally easy to operate.

As further shown in the instant embodiment, a bus 350 is shown for communication from the display printed circuit board 340 to the main printed circuit board 310. The bus 350 may deliver operating parameters from the display printed circuit board 340 to the printed circuit board 310. Such parameters may include operating mode selection, set temperature, tilt error from the tilt sensor 348, and other parameters.

A line bus interface 374 is shown and allows for operation or communication with a bus of the vehicle cooling. For example, where the air conditioning system or parking cooler is to be in communication with the vehicle integrated cooling system, the interface 374 allows for communication with the vehicle cooling system for improved performance and control. Still further communication one or more communication ports 360 may be provided, for example to provide error feedback from the main printed circuit board 310 to the display circuit board 340. In the event of such error detection at the printed circuit board 310, the display circuit board 340 may direct an error message on the display 342. Even further, the printed circuit board 310 may provide power to the display printed circuit board 340 via power bus 362 or in the alternative may provide two-way power signal between the display PCB 340 and the printed circuit board 310.

Also located on the printed circuit board 310 is an interface 370. Various interface types may be utilized with at least one goal being for updates of software, firmware or other programming on the printed circuit board 310. Still further, the interface 370 may also be used for diagnostic analysis, repair and/or service work. The interface may be of various forms including but not limited to RS-232, USB X.X, RJ-11, RJ-45, Thunderbolt and others.

In further embodiments, the display 342, in combination with the display printed circuit board 340, may provide for various operating modes which may be selected by a user or may have some or all decisions made by the controller 300. In some embodiments, there may be an automatic mode wherein operating characteristics are determined based on differential between the set temperature and the cabin temperature. In the automatic mode, the speed of the compressor 40 and fans are regulated based on temperature differential between the set temperature (user dictated) and the cabin temperature. As the cabin temperature approaches the set temperature, the incremental change in compressor speed may decrease. Alternatively, the change in compressor speed may be incrementally larger when the differential between the set point and cabin temperature is larger. Once the temperature differential is within a preselected range, for non-limiting example + or −1K, the speed of the compressor may remain unchanged.

Likewise, the temperature differential between set point temperature and cabin temperature may cause larger or smaller increases or decreases in the fan speeds of evaporator and condenser fans 51, 45. Where there is a larger differential, the fan speed may change by incrementally larger amounts. As the temperature differential becomes smaller, the amount of incremental change of the fan speed become smaller. The fan speed may be dynamically changing or may change in discrete steps or amounts. This may be dependent upon how the change in fan speed, compressor speed or both affect overall interior noise levels.

In other embodiments, which may be alternative or additional, there may be an economy mode. In the economy mode, the controller 300 may operate like the automatic mode but alternatively, may have a maximum compressor speed which is reduced relative to the automatic mode. For example, the economy mode may have a maximum compressor speed of less than the, for example, 3600 rpm maximum.

In a further alternative mode, a manual mode, the speed of evaporator fan 51 may be set. For example, the evaporator fan speed may be set in some preselected number of incremental values. There may be a low, medium, and high speed or alternatively, there may be more or fewer preselected speeds. For example, in some embodiments the system may utilize five speed settings. Also, for example, in some embodiments the system may utilize continuously variable speed settings. Thus, various settings are available to provide a desired cooling level to aid in achieving necessary rest.

Still further, the controller 300 may also have a boost mode. This mode may be desirable when fast cooling of the cabin is needed at a maximum performance level. In such embodiment, the compressor speed and fan speed are set to maximum values. The boost mode may be set to a preselected (or user selected) time limit, for example 20 minutes or some other designated time period. Once the time period is reached, the controller 300 may revert to manual or automatic mode, for example. Alternatively, when the set temperature is reached, the controller 300 may change modes rather than continuing in the boost mode in order to increase battery usage time.

The system may also comprise a timed or time mode of operation. This mode may be most beneficial in the automated, manual or economy modes or settings. The timer mode may provide some preselected time limit for operation, after which the air conditioner is turned off. Alternatively, the time period may be selected by the user, for example and may be adjusted based on a desired time period of operation. This selection may be made at the user interface 346 of the display PCB 340.

A further feature of the present embodiments may be under-voltage protection. The controller 300 includes a battery voltage sensor 326 as previously described. If the battery voltage drops below a pre-defined threshold for some period of time, the air conditioning system may be shut down. The end user may be able to change the threshold level within the user interface 346 by way of the display PCB 340 or alternatively, through manufacturer or service representative, programming through interface 370. The threshold may be changed, for example between an upper limit and a lower limit. Therefore, a vehicle specific or usage specific setting may be possible.

A time delay may be necessary to avoid the air conditioning system from shutting off due to a short load dump. A previously mentioned, a separate cable may be desirable to ensure an accurate measurement of voltage is provided and unaffected by other components or due to voltage drop or loss in a main cable.

Further, there may be a hysteresis value which should be exceeded before the air conditioning system 10 can be restarted. This may prevent unstable behavior due to slight voltage increase with the current load is switched off or removed.

The main printed circuit board 310 of the controller 300 also provides the additional advantage of being a universal board which may be used for different arrangements. As noted previously, various optional features may be built into the air conditioning system 10, including but not limited to, a condensate water pump, a water level indicator, and an additional condenser fan. The controller 300 will operate any of the various air conditioning systems readily. Therefore, in manufacturing or in service and repair, the need for differing control systems is needed. Instead, a single controller may be utilized and can make determinations about the actuators and sensors utilized in order to determine how to properly operate the air conditioning system 10. This determination may be made by way of pre-programming the controller 300, in which case the controller 300 is only making a determination of presence of the actuator, or may be made in real-time as a function of the start-up process for the controller 300, wherein at each start-up for example, the controller 300 determines which actuators and sensors are present and determines how to best operate the air conditioning system 10. Alternatively, the controller 300 may determine based on programming whether the proper actuators are present to operate properly. Thus in some embodiments, the controller 300 may compare the programming values for actuators which are supposed to be present versus actual values to ensure the actuators needed for operation are in fact present. If the actual value doesn't match the programmed value, then an error message may be created.

According to some embodiments, the controller 300 may determine if the actuators and sensors which are needed for operation are in fact connected. When the controller 300 is programed, it may be programmed with corresponding necessary actuators and/or sensors needed for proper operation. Thus the determination may be made at start up whether the necessary actuators and sensors are all present by electrical communication with the circuit board 310.

In some embodiments, the voltage provided by the one or more batteries may be 12V, 24V or may be other voltages. In some embodiments, the printed circuit board 310 may operate at some standard voltage, for example 24V. Therefore a DC-DC converter 57 may be provided to step up the voltage from the one or more batteries from for example 12V to the desired voltage of 24V, for example.

Once the controller 300 determines that either all of the necessary actuators are present, or that one or more actuators or sensors are not present, the printed circuit board will either make a determination that operation can continue or an error message will be sent to the display printed circuit board 340.

In the case that operation proceeds, the display circuit board 340 will provide a further signal to the main printed circuit board 310. The display printed circuit board 340 will also receive a user input corresponding to an operating mode. The operation of the air conditioning system 10 is controlled by control values for the actuators, which correspond to specific mode settings. As discussed, the air conditioning system 10 may operate in a variety of modes. For example, the system may function in automatic mode, in economy mode, in manual mode and in boost mode. The parameter for example, automatic, economy, boost or manual modes may be sent from the display printed circuit board 340 to the main printed circuit board 310. The parameter signal may be so specific as to include operating speeds or the parameter may be a more general signal which is sent to the main printed circuit board 310 (e.g., to the controller 300) and the actual speed signal or control value for the actuators may be stored on the main printed circuit board 310 (e.g., in memory associated with the controller 300) for direction to the motors. Each of these modes have corresponding control values for the mode.

Accordingly, the display printed circuit board 340 may provide a signal to the printed circuit board 310 (e.g., to the controller 300) having the desired operating mode while the control values are stored on the printed circuit board 310 (e.g., on memory associated with the controller 300). Or, alternatively, the display printed circuit board 340 may provide the actual control values to the printed circuit board 310. In either embodiment, the control values direct the speeds of the compressor 40 and fans 51, 45. For example, when the boost mode is selected and maximum cooling is desired, the control values may provide that the compressor 40 may be set to maximum speed and the evaporator and condenser fans 51, 45 may be set to maximum speed. Further, a time limit may be sent to the main printed circuit board since the boost mode may be operated at a preselected period of time in order to extend battery life.

In an economy mode, alternate control values may provide a reduced compressor speed. Further, the speeds of the evaporator and condenser fans 51, 41 may also be reduced. The settings for economy mode may be stored on the printed circuit board 310 (e.g., in memory associated with the controller 300) or may be sent from the display printed circuit board 340 when the mode selection is made.

In the automatic mode, preselected speed setting may be provided either from the display printed circuit board 340 or may be stored on the main printed circuit board 310 (e.g., in memory associated with the controller 300) once the display printed circuit board 340 signals which mode of operation is desired. The motor speed will reduce speed as the differential between set temperature and actual temperature decrease. Further, the increment of compressor and/or fan speed change may decrease as the differential decreases. Alternatively, the incremental fan and/or compressor speed may increase if the differential is higher.

In the manual mode, the inputs are provided at the display printed circuit board 340 for example from the display 342. As a result, the manual settings for the actuators may be on the printed circuit board 310 (e.g., in memory associated with the controller 300) or may be on the display printed circuit board 340 and sent to the printed circuit board 310, as with the other modes.

Figure 10:
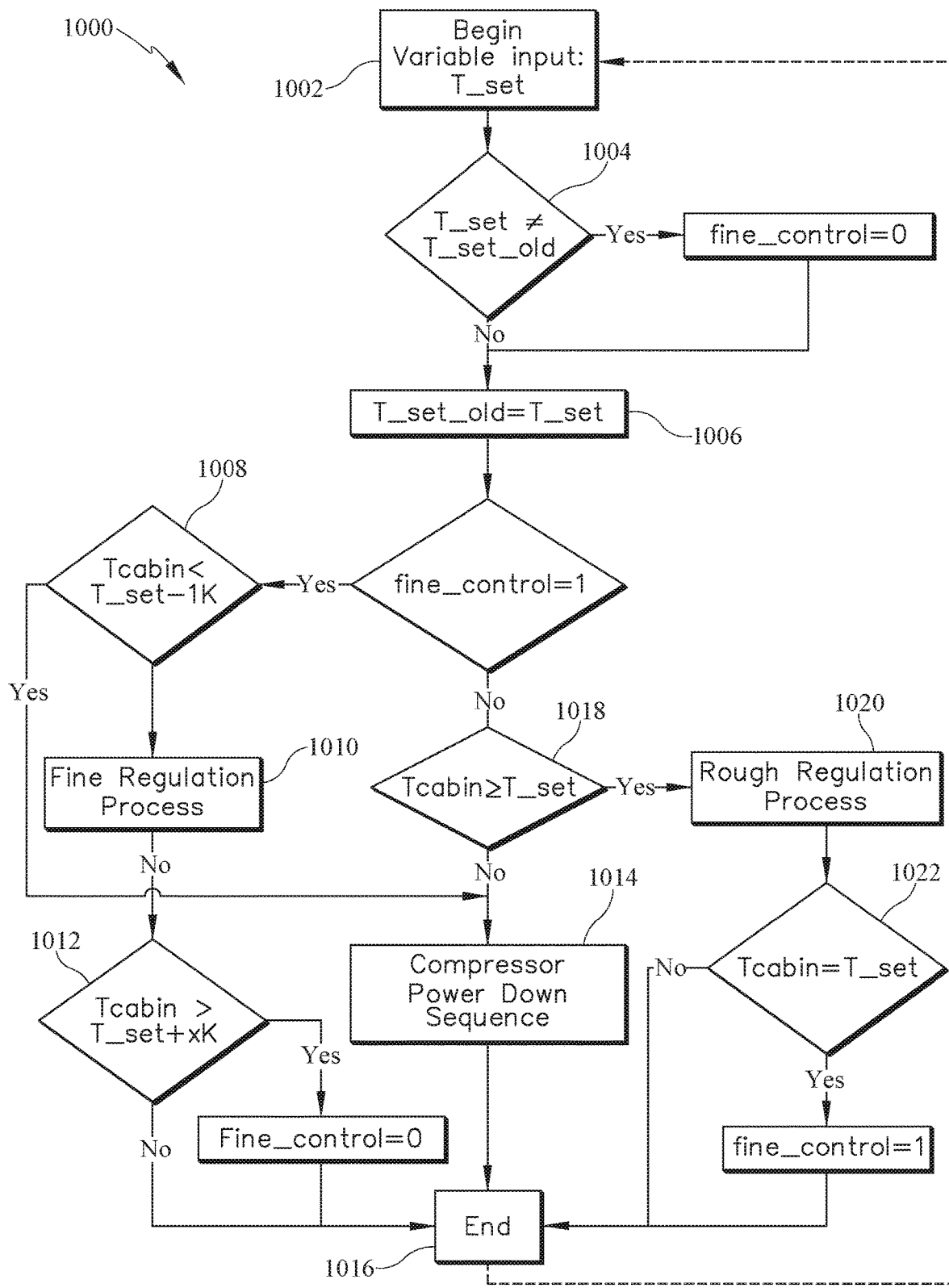

Referring now to FIG. 10, a method 1000 of utilizing the automatic operation mode is shown. Other embodiments may perform the steps of method 1000 in a different order, omit certain steps, and/or perform different and/or additional steps than those illustrated. A system of one or more components (e.g., component(s) of FIGS. 9A and 9B) may perform the method 1000 such as, for example, controller 300.

In some embodiments, the speed changes of the compressor may be made at a constant acceleration or deceleration. For example, the acceleration or deceleration may be at some preselected increments such as for example 300 revolutions per minute (RPM) per second or the acceleration/deceleration may vary depending on the situation or mode being operated. Alternatively, other rates of acceleration may be desirable or the rate of acceleration may vary. Further, in this embodiment, the evaporator and condenser fan speed changes may be automatically regulated. In the method 1000 shown in FIG. 10, the compressor and fans are automatically controlled and the display 342 will show a predefined automatic mode symbol.

The automatic control method is first discussed. At the beginning of the method 1000, the variable input set temperature (T_set) is input at step 1002. This may be done by the user to input a desired cabin temperature. Next, at step 1004, the system determines if the set temperature (T_set) is not equal to a temperature previously defined by a user (T_set_old). If the values are not equal, the T_set_old is set to the used inputted T_set at step 1006. If the answer at step 1004 is yes, the process continues at step 1006. Thus, the input set temperature is used even if it was previously used. The method 1000 next determines whether the cabin temperature (Tcabin) is less than the set temperature (T_set) minus some preselected variable, such as for non-limiting example, 1K at step 1008. If the temperature of the cabin (Tcabin) is less than the set temperature (T_set) minus 1K, then the method 1000 next begins a compressor power down step 1014. The compressor speed may be changed or maintained at a minimum speed or may be turned off. Next the method 1000 may determine may be ended at step 1016. It should be understood that the method described is a repeating process which occurs multiple times within a given time period. Thus, one skilled in the art will recognize that the process will return to the top of the method depicted and start again in a cycle. This method may occur in addition to other processes which the controller 300 may be performing simultaneously or serially in a series of methods.

Alternatively, at step 1008, if the cabin temperature (Tcabin) is not less than the set temperature (T_set) minus 1K, a fine regulation process may occur at step 1010. Fine regulation relates to fine adjustment of temperature, for example when the actual cabin temperature is close or within a specific range relative to the set temperature, thus requiring only fine adjustment. Next at step 1012, the method 1000 determines if the cabin temperature (Tcabin) is greater than the set temperature (T_set) plus 1K. If the determination is yes, then a fine control value is stored and the method 1000 loops back in the process to go through the steps again by way of step 1016. If the temperature of the cabin is not greater than the set temperature plus some variable at step 1012, the process may end at step 1016 and the method cycle again.

Returning again to step 1006, the method 1000 may determine if the cabin temperature is greater than the set temperature at step 1018. If the method 1000 determines that the cabin temperature is greater than or equal to the set temperature at step 1018, a rough regulation step 1020 may occur. Rough regulation refers to temperature regulation or adjustment when the actual cabin temperature is farther from the desired set temperature, thus requiring a more rough adjustment than the previously described fine adjustment. Next, the method 1000 again determines if the cabin temperature is equal to the set temperature at step 1022. If the answer is no at step 1022, the process may end at step 1016 and cycle through the process again. If alternatively the answer is yes at step 1022, the method 1000 may store a value and loop back to the beginning of the method or step intermediate thereto by way of step 1016.

During these steps, the compressor speed may be varied in speed depending on the comparison of the set temperature to the cabin temperature. Further, the fan speeds for the evaporator and condenser fans 51, 45 may be varied or may be maintained as a constant. For example, in some embodiments, the evaporator fan 51 may be set to 80% of maximum speed and the condenser fan speed may be set at 50%. The percentage may be a percentage of maximum operating speed or a percentage of a normal operating speed which may be a different preselected value. The amount of increase of compressor speed may be dependent on compressor capacity, motor size and other variables which may affect change of temperature by flow rate variations. Similarly, the values for the fan speed may be dependent on at least motor type, fan type and size, and flow rates associated with operating ranges.

In the automatic mode, the process may loop to continually compare set temperature and actual temperature and therefore adjust operation. The entire process may start again for example based on a time limit, upon the expiration of which the process starts again by comparing the set temperature to a measured cabin temperature, or upon a new input of set temperature. Other basis for starting the process may be utilized as well. When the cabin temperature reaches the actual temperature, the compressor may power down after several cycles through the method 1000. For example, a preselected time period may be set within which the actual temperature is stable and at the set temperature or within a desired range. After this preselected time period, the compressor may power down to a lower speed or be shut down. However it may be that shut down does not occur for at least several minutes of temperature stability at or near the set temperature.

The previously described method 1000 may be utilized for automatic mode operation of the air conditioning system 10. In other embodiments, the parking cooler 10 may be operated in an economy mode. In such mode, an economy mode symbol may for example appear on the display 342. As previously described, the economy mode is desirable to conserve battery power and therefore operates at a reduced cooling capacity for longer operating time, for example on battery power. In this method, the compressor speed changes may be carried out with a preselected acceleration/deceleration amounts or alternative rates or non-constant acceleration as previously described. Further, the evaporator fan speed and the condenser fan speed may automatically be regulated to lower values than in the previous automatic mode embodiment.

The economy mode is now described. Various steps are similar to the embodiment of FIG. 10. First, a variable input set temperature (T_set) is provided by the user. The method next makes the determination of whether the set temperature (T_set) is not equal to an older value of a set temperature (T_set_old) as described in the previous embodiment. The set temperature (T_set) is stored or replaces the previous old set temperature (T_set_old) and the process continues.

Next, the method makes a determination whether the temperature of the cabin (Tcabin) is less than the temperature set (T_set) minus some variable such as 1K. If the determination is yes, the compressor speed is decreased, stays the same or powers down. The evaporator fan and condenser fan may be set to some preselected amount to maintain temperature or powered down as well. Next, the process ends for some desired time or until the set temperature is changed. As noted before, the end of the process results in a further cycling through the steps until a stable temperature is reached for a period of time, after which the compressor may be powered down to a slower speed or shut off.

Alternatively, if the temperature of the cabin (Tcabin) is not less than the temperature set (T_set) minus 1K for example, the method may perform some fine regulation of temperature. This may involve increasing compressor speed or increasing fan speeds or both for some limited time period. After the fine temperature regulation, the method may again check if the cabin temperature is greater than the set temperature plus some variable amount, for example 1K. If the cabin temperature is still higher than desired, the process may loop back to an earlier step and begin again. Alternatively, if the cabin temperature is not greater than the set temperature plus some variable, the process may be ended and cycle through again.

Alternatively, after the set temperature is stored, if the cabin temperature is greater than or equal to the set temperature, a rough temperature regulation process may occur. After such process, the cabin temperature is compared again to the set temperature. If the temperatures are equal, the returns to the step of determining if the cabin temperature is less than the set temperature plus some variable amount. I after the rough regulation step, the cabin temperature is not equal to the set temperature, the process may end and cycle through again.

In the economy mode operation, the speed of the compressor may be reduced as compared to the speed in the automatic mode. Further, the fan speeds may be reduced relative to the automatic mode. However, these may be adjusted upwardly to decrease the cabin temperature toward the set temperature. However, the maximum operating speeds of the compressor and the fans may be limited versus the automatic mode in order to reduce power consumption of the system from the battery.

In addition to the automatic and economy modes, the parking cooler may also operate in a boost mode wherein the cooling capacity is maximized for a limited period of time to reduce temperature more quickly than in other modes. In this mode, the cooling capacity is maximized in order to effectuate rapid cooling for a limited period of time with the air conditioning system 10. As in previous embodiments, a boost mode symbol may be displayed on display 342. In this embodiment as the others, the speed changes may be carried out at some desired acceleration rate or varied acceleration rates. In this embodiment, for example, the rotation rate of the compressor may have a maximum 3600 RPM which may be faster than the previous embodiments however, this value is merely one non-limiting example. Other speeds may be utilized.

In this mode, the fan speeds and the compressor speed may be set to some higher values than in the previous modes. Further, the boost mode operates for a preselected period of time and this time period may be input by the user or may be some preprogrammed time period which is stored in the controller 300. Thus, the boost mode may operate with the aid of a timer for the system. The boost mode method may cycle through the process multiple times as previously described or may work solely on timer or may work through the method described and in combination with the timer.

Finally, the parking cooler 10 may be operated manually in addition to the previously described modes. In some embodiments, the compressor and condenser fan speeds may be operated similarly to the method shown in FIG. 10. Further, in some embodiments, the compressor speed may be kept constant and only the evaporator fan speed adjusted manually. In other embodiments, the method involves various speed changes of the compressor 40 which may be carried out at some preselected amount, for non-limiting example, 300 RPM increments. Or, combinations of these manners of operation may be utilized. Further, the fan speed of, for example the evaporator fan 51, may be varied manually at some preselected number of discreet values, for example ranging from three speed selections or, in other embodiments, having more, such as for example five speed selections. The amount of control may be varied by varying the number of steps involved in evaporator fan speed operation.

The user defined set temperature (T_set) and a speed set corresponding to some predefined speed setting for the evaporator fan, for example low, medium or high. It may be desirable for simplicity to use some preselected condenser fan speed in the manual operation mode, although in some embodiments the condenser fan speed may also be adjusted based on temperature differences between the set temperature and the cabin temperature. The speeds may be adjusted downwardly by the controller 300 when the desired temperature is reached, again in an effort to reduce power consumption of the battery.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

"Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A mobile air conditioning system, comprising:
   a variable speed compressor having a brushless DC motor, a condenser, an evaporator, and an expansion valve;
   a single housing formed of a base and a shroud wherein said single housing is capable of being connected to a vehicle, said single housing defining an interior space wherein one or more of said variable speed compressor, said condenser, or said evaporator are capable of being located;
   said interior space having a first portion wherein said one or more of said variable speed compressor, said condenser, or said evaporator are disposed, and a second portion wherein a second one or more of a second variable speed compressor, a second condenser, or a second evaporator may be added to increase cooling capacity of the mobile air conditioning system.

2. The mobile air conditioning system of claim 1, further comprising a printed circuit board which provides a speed signal to an evaporator fan or an a condenser fan.

3. The mobile air conditioning system of claim 2, said printed circuit board receiving a tachometer feedback signal.

4. The mobile air conditioning system of claim 2, said printed circuit board in electrical communication with a remotely positioned display.

5. The mobile air conditioning system of claim 4, said printed circuit board capable of receiving a plurality of input parameters from a display printed circuit board.

6. The mobile air conditioning system of claim 2, said printed circuit board determining if said second one or more of said second variable speed compressor, said second condenser, or said second evaporator are present.

7. The mobile air conditioning system of claim 6, said printed circuit board receiving at least one sensor signal from one or more sensors.

8. The mobile air conditioning system of claim 7, said one or more sensors comprising one or more of a cabin temperature sensor, an outside temperature sensor, or a compressor temperature sensor.

9. The mobile air conditioning system of claim 8, further comprising a battery voltage sensor, wherein said battery voltage sensor is isolated from other power.

10. The mobile air conditioning system of claim 2, said printed circuit board controlling fan speed of one or more of said evaporator fan, said condenser fan, or said compressor motor speed.

11. A mobile air conditioning system, comprising:
   a housing having a base and a shroud wherein said housing defines an interior space for positioning of a first one or more cooling mechanicals: a variable speed compressor, a condenser, and/or an evaporator;
   said interior space having a first portion and a second portion wherein said first portion and said second portion are symmetrically disposed;
   said first one or more cooling mechanicals disposed in said first portion, and a second one or more cooling mechanicals capable of being positioned in said second portion when a larger cooing capacity is desired;
   a printed circuit board disposed in said housing;
   said printed circuit board controlling said first one or more cooling mechanicals and receiving input from one or more sensors.

12. The mobile air conditioning system of claim 11, said one or more sensors comprising one or more of a cabin temperature sensor, an outside temperature sensor, or a compressor temperature sensor.

13. The mobile air conditioning system of claim 12, further comprising a battery voltage sensor, wherein said battery voltage sensor is isolated from other power.

14. The mobile air conditioning system of claim 11, further comprising a remotely positioned display, said printed circuit board in electrical communication with a display printed circuit board of said remotely positioned display.

15. The mobile air conditioning system of claim 11, wherein said housing is a single housing capable of being positioned at a single location of a vehicle.

16. The mobile air conditioning system of claim 11, wherein said housing is a first housing and a second housing.

17. The mobile air conditioning system of claim 16, said first housing defines said first portion and said second housing defines said second portion.

18. The mobile air conditioning system of claim 16, said first housing and said second housing capable of being spaced apart when installed on a vehicle.

19. The mobile air conditioning system of claim 16, said evaporator being positioned in said second housing.

\* \* \* \* \*